(12) United States Patent
Chino et al.

(10) Patent No.: US 7,133,020 B2
(45) Date of Patent: Nov. 7, 2006

(54) TRANSFER APPARATUS

(75) Inventors: Naoyoshi Chino, Kanagawa (JP);
Atsushi Uejima, Kanagawa (JP);
Hideaki Ito, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 544 days.

(21) Appl. No.: 10/691,566

(22) Filed: Oct. 24, 2003

(65) Prior Publication Data
US 2004/0090414 A1  May 13, 2004

(30) Foreign Application Priority Data
Oct. 25, 2002  (JP)  .............................. 2002-311091
Nov. 7, 2002  (JP)  .............................. 2002-324010
Nov. 8, 2002  (JP)  .............................. 2002-325349

(51) Int. Cl.
*G09G 3/36* (2006.01)

(52) U.S. Cl. ........................................ 345/102; 349/65

(58) Field of Classification Search ................ 345/102, 345/88, 94, 104; 347/241, 256; 349/65, 349/62; 348/333.09; 396/30; 359/630
See application file for complete search history.

(56) References Cited

FOREIGN PATENT DOCUMENTS

| JP | 04-186332 | * | 7/1992 |
|----|-----------|---|--------|
| JP | 4-194832 A | | 7/1992 |
| JP | 10-309829 A | | 11/1998 |
| JP | 11-242298 A | | 9/1999 |
| JP | 2002-196424 A | | 7/2002 |
| JP | 2002-196425 A | | 7/2002 |
| JP | 2002-196426 A | | 7/2002 |

* cited by examiner

*Primary Examiner*—Richard Hjerpe
*Assistant Examiner*—Abbas Abdulselam
(74) *Attorney, Agent, or Firm*—Sughrue Mion, PLLC

(57) ABSTRACT

In the transfer apparatus, accumulated maximum transmittance of the color filters in each of ranges, in which respective spectral transmittance curves of the color filters overlap each other, is set smaller than a predetermined value. Alternatively, a light source is produced so that a light emission peak exceeding a predetermined size does not exist in each range in which at least two of red, green, and blue spectral sensitivities of a photosensitive recording medium overlap each other. Still alternatively, at least one of wavelength and light quantity of light passing through the image display device is controlled to thereby control gray tone to be recorded on the photosensitive recording medium.

17 Claims, 13 Drawing Sheets

TRANSFER APPARATUS

BACKGROUND OF THE INVENTION

1. Field of the Invention

The present invention relates to a transfer apparatus that displays an image, which was digitally recorded by a digital still camera (DSC), a video camera, a personal computer (PC), or the like, on a transmission type image display device formed by a liquid crystal display device (hereinafter referred to as "LCD") or the like, and transfers the image displayed on the transmission type image display device onto (forms the image on) a photosensitive recording medium such as an instant photographic film that develops colors when illuminated by light.

2. Description of the Related Art

As a method for transferring, printing or recording a digitally recorded image onto or on a recording medium, various systems have conventionally been known, examples of which include an ink jet system using a dot-shaped print head, a laser recording system, and a thermal recording system.

A printing system like the ink jet system has various problems. For instance, a long time is taken to perform printing, ink is likely to cause clogging, and precise printing results in a situation where a printed sheet is moistened by ink. Also, the laser recording system requires an expensive optical component such as a lens, which results in a problem that the apparatus cost is increased. Further, the laser recording system and the thermal recording system require considerable power consumption, thereby being not suited for carrying the system, which is also a problem.

Thus, generally speaking, transfer apparatuses using those systems, in particular, transfer apparatuses using the ink jet system have such a problem that the more precise printing is performed in the apparatus, the more complicated the driving mechanism and the control mechanism become, as well as the larger and the more expensive the apparatus become. In addition, there is a problem in that a long time is taken to perform printing.

In this regard, a transfer apparatus is proposed in which a display image is formed on a photosensitive recording medium such as an instant film using an LCD, thereby achieving simplification of an apparatus structure and a reduction in cost (see JP 10-309829 A and JP 11-242298 A, for instance).

The electronic printer (transfer apparatus) disclosed in JP 10-309829 A is capable of copying the display screen of a liquid crystal display onto a photosensitive medium to thereby produce a hard copy having a photographic quality. On the other hand, in the case of the printing apparatus disclosed in JP 11-242298 A, there is no need to use an expensive optical component such as a lens, and to secure an appropriate focal length. Thus, as compared with the conventional transfer apparatuses, a further reduction can be achieved in terms of size, weight, power consumption, and cost.

FIG. 22A is a side view of the printing apparatus disclosed in JP 11-242298 A and FIG. 22B is an enlarged view of a portion D of FIG. 22A. In this printing apparatus, as shown in FIG. 22A, a photosensitive film 400 is brought into intimate contact with the display surface of a transmission type LCD 300, and a light source (backlight 100) provided on the opposite side of the LCD 300 with respect to the photosensitive film 400 is turned on. That is, a fluorescent lamp 101 is switched on to turn on the backlight 100. In this manner, an image displayed on the LCD 300 is printed onto the photosensitive film 400. Here, as shown in FIG. 22B, the LCD 300 includes a polarizing plate 301 and a glass substrate 302 on the display surface side, a liquid crystal layer 303, and a glass substrate 304 and a polarizing plate 305 on the backlight 100 side. Also, the total thickness from the polarizing plate 301 to the polarizing plate 305 is set at 2.8 mm.

FIG. 23 is a perspective view of a printing apparatus according to another embodiment disclosed in JP 11-242298 A. In the embodiment disclosed in JP 11-242298 A, as shown in FIG. 23, a lattice 200 is provided between the backlight 100 and the LCD 300, thereby suppressing diffusion of light from the backlight 100. That is, the lattice 200 approximates the light from the backlight 100 to parallel rays. Further, a spacer 201 formed by a rectangular hollow case is provided between the lattice 200 and the LCD 300, thereby preventing an image of a frame of the lattice 200 (shadow due to the frame) from being taken by the photosensitive film 400. With this construction, clarity of an image formed on the photosensitive film 400 is improved to a satisfactory degree from the practical point of view without providing an optical component and securing an appropriate focal length.

Also, JP 11-242298 A discloses an example of a printing apparatus in which the total thickness of the LCD 300 is set at 2.8 mm, as shown in FIG. 22B, and a screen of the LCD 300 displayed with a dot size of 0.5 mm is printed onto the photosensitive film 400. In this printing apparatus, a lattice 200 that has a thickness of 10 mm and is provided with 5 $mm^2$ through-holes is provided in order to prevent diffusion of light emitted from the LCD 300, and a 20 mm spacer 201 is arranged between the lattice 200 and the LCD 300. Further, the LCD 300 and the photosensitive film 400 are brought into intimate contact with each other to effect printing without causing blurring (unclarity) of the image.

In addition, as a transfer apparatus that realizes reductions in size, weight, power consumption, and cost with a simplified construction and is suited for carrying the apparatus, a transfer apparatus is, for instance, known in which a light source, a light linearizing unit, a transmission type image display unit, and a photosensitive recording medium are arranged along an advancing direction of light from the light source, the light from the light source is converted by the light linearizing unit into linear and substantially parallel rays and is caused to perpendicularly enter a display surface of the image display unit, and the image display unit is relatively scanned by the linear and substantially parallel rays, thereby transferring a display image having passed through the image display unit onto the photosensitive recording medium (see JP 2002-196424 A, JP 2002-196425 A, JP 2002-196426 A, and the like, for instance).

However, in the transfer apparatus disclosed in JP 10-309829 A, in order to copy the display screen of the liquid crystal display onto the photosensitive medium, an optical component such as a rod lens array, needs to be arranged between the display screen of the liquid crystal display and the photosensitive medium, which leads to a problem in that the apparatus cost is increased by the expensive optical component. Also, a predetermined distance (total conjugate length) needs to be set between the liquid crystal display and the photosensitive medium, which imposes a limitation on a reduction in the apparatus size. In JP 10-309829 A, for instance, it is necessary to secure a total conjugate length of 15.1 mm.

Further, in the printing apparatus disclosed in JP 11-242298 A, an image is obtained by bringing the LCD and the photosensitive film into intimate contact with each other and printing the image onto the photosensitive film. In this case, several colors are mixed with each other and therefore it is difficult to precisely reproduce the colors, which results in a problem in that the quality of an image transferred onto the photosensitive film is degraded. Reasons for this will be described below.

That is, first, in order to present an image that is to be felt beautiful and bright by a human, a red (hereinafter referred to as "R") color filter, a green (hereinafter referred to as "G") color filter, and a blue (hereinafter referred to as "B") color filter provided for a color LCD are each generally produced to have high transmittance and a wide transmission wavelength range.

FIG. 5 is a graph in which the spectral transmittance curves of the RGB color filters are plotted with transmittance as ordinate against wavelengths as abscissa. In FIG. 5, there are shown examples of the spectral transmittance curves $R_1$, $G_1$, and $B_1$ of the color filters of the LCD. As shown in FIG. 5, each color filter of the LCD is produced so as to have a wide transmission wavelength range. Accordingly, in the vicinity of a wavelength of 600 nm, the transmission ranges of R light and G light overlap each other. Also, in the vicinity of a wavelength of 500 nm, the transmission ranges of B light and G light overlap each other. In each of such overlapping ranges, light in one color and light in another color are both allowed to pass through the color filters.

Further, when a cold-cathode tube is used as the backlight light source of the LCD, the light-emission range of a fluorescent material used in the cold-cathode tube is increased as much as possible in order to increase a light quantity. Further, in order to realize an image that is to be felt bright by a human, the intensity of G light is generally increased.

FIG. 24 is a graph in which the spectrum waveform of the backlight light source of the LCD is plotted with light intensity as ordinate against waveforms as abscissa. The spectrum waveform of the light source shown in FIG. 24 is a spectrum waveform of a cold-cathode tube of a so-called three-wavelength type. As shown in FIG. 24, the spectrum waveform has the biggest peak in the vicinity of a wavelength of 550 nm at which G light is emitted, and also has big peaks in the vicinity of a wavelength of 580 nm and in the vicinity of a wavelength of 490 nm.

Further, the photosensitive film onto which an image is to be transferred, has a considerable peak in each wavelength range in which color development is performed with one of R light, G light, and B light. However, the color development range of the R light and the color development range of the G light overlap each other at their boundary, and the color development range of the G light and the color development range of the B light overlap each other at their boundary.

FIG. 25 shows the spectral sensitivity distribution of an instant film for use in "cheki" (manufactured by Fuji Photo Film Co., Ltd.) that is an example of the photosensitive film. In FIG. 25, the spectral sensitivity characteristics of the photosensitive film with respect to the R light, the G light, and the B light are plotted with sensitivity as ordinate against wavelengths as abscissa. As shown in FIG. 25, even in the case of this instant film, overlapping of the color development ranges of the R light and the G light occurs in their boundary range of 570 to 600 nm and overlapping of the color development ranges of the G light and the B light occurs in their boundary range of 480 to 510 nm, although their overlapping degrees are small.

Accordingly, at the boundary range (color mixture range) at which color developing is performed with both of the R light and the G light, light having the wavelength in this range (light whose peak exists in the vicinity of 580 nm and in the vicinity of 480 nm) develops both of R and G colors on the photosensitive film. Also, at the boundary range (color mixture range) at which color development is performed with both of the G light and the B light, both of G and B colors are developed. As a result, color mixture occurs in a resultant image and therefore the image quality is degraded.

In the above description, a case where the light source emits each of the R light, the G light, and the B light has been explained. Even when one of RGB colors is displayed on the LCD and the photosensitive film is exposed with the single color, mixture with another color also occurs. This will be described below by taking a case of G color as an example.

In order to display only the G color on the LCD, setting is made beforehand so that light is allowed to pass through only dots of the G color filter of the LCD and is not allowed to pass through dots of the R and B color filters. Under this condition where only the G color is displayed on the LCD, the three-wavelength-type cold-cathode tube shown in FIG. 24 is turned on for a required time. Note that at this time, the three-wavelength-type cold-cathode tube emits light at all wavelengths at which it is capable of performing light emission. This light is allowed to pass through the G color filter of the LCD and reach the photosensitive film. Accordingly, the light that can reach the photosensitive film becomes light obtained by multiplying the light wavelength of the G color filter of the LCD by the transmittance of the G color filter.

FIG. 26 is a graph in which the spectral intensity characteristics of light having passed through the G color filter of the LCD are plotted with light intensity as ordinate against wavelengths as abscissa. In the intensity distribution of the light having passed through the G color filter shown in FIG. 26, transmission light exists in a gently inclined B range of around 440 to 480 nm and has a small peak in the vicinity of 490 nm. Also, in an R direction (on a long wavelength side), transmission light having a peak exists in the vicinity of 580 nm and transmission light having a small peak exists in the vicinity of 610 nm. Among those, in particular, transmission light at 490 nm contains light in the B range of the film.

That is, even if a light source having the spectral wavelength characteristics shown in FIG. 24 is used to display G color on the LCD and expose the photosensitive film, reproduced G color is mixed with B color to some extent, although the color of an image transferred onto the photosensitive film has a color that is almost the same as the original G color.

FIG. 28 shows a result of exposure of the photosensitive film in the manner described above. In FIG. 28, results of color development of RGB colors are plotted with densities as ordinate against gradation as abscissa. In FIG. 28, in a downward direction on the ordinate, the density is reduced (that is, brightness is increased) and therefore the degree of color development is increased. As shown in FIG. 28, in addition to the graph of G color, the graph of B color also moves in the downward direction and the B color is also developed to some extent. For instance, at the gradation of 120, the density of G is around 1.0 and the density of B is 1.74. As a result, it is found that B is slightly mixed into G.

Also, usually, the spectral sensitivity characteristics of the photosensitive recording medium like the instant film described above are adjusted so as to be suited to daylight or electronic flash light, which means that the spectral sensitivity characteristics of the photosensitive recording medium are not suited to the light source spectrum of the cold-cathode tube that is the light source of the liquid crystal display. Therefore, there arises a problem in that the gray tone is not correctly reproduced. Also, when gray is displayed on the liquid crystal display, the mismatching degree with the spectral sensitivity characteristics of the photosensitive recording medium is increased due to the characteristics of the color filter applied to the liquid crystal display and therefore an image formed on the photosensitive recording medium takes on a blue tinge, for instance.

Further, basically, when the RGB components of the light from the light source are equally mixed with each other, gray (between black and white) is obtained. However, the spectral sensitivity characteristics of the photosensitive recording medium do not match the light source spectrum as described above, so that it is necessary to control light passing through the liquid crystal display by, for instance, adjusting the light source with reference to the difference in terms of the spectral sensitivity characteristics of the photosensitive recording medium.

As described above, in the conventional transfer apparatuses, color mixture inevitably occurs, so that there arises a problem in that it is impossible to obtain an image having an appropriate color and the image quality is degraded. In view of this problem, it is desired not only to simply transfer an image displayed on an LCD but also to obtain a high quality image by improving color reproductivity.

SUMMARY OF THE INVENTION

The present invention has been made in order to solve the above-mentioned problems of the related art, and provides a transfer apparatus with which an apparatus construction is simplified, the color purity of each of R, G, and B in a transmission type image display device is improved, it is possible to attain superior color reproductivity and in particular to properly reproduce the gray tone when the display screen of the image display device is transferred onto a photosensitive recording medium, and it is possible to obtain a print on which a high-quality image has been transferred.

In order to attain the object described above, the present invention provides a transfer apparatus comprising a light source, a transmission type image display device that has a structure where a liquid crystal layer is held by substrates from both sides, and red, green, and blue color filters provided for the transmission type image display device, wherein a photosensitive recording medium is arranged in series with the light source and the transmission type image display device along an advancing direction of light from the light source so that an image display surface of the transmission type image display device and a recording surface of the photosensitive recording medium oppose each other, and a display image having passed through the transmission type image display device is transferred onto the recording surface of the photosensitive recording medium, wherein accumulated maximum transmittance of the color filters in each of ranges, in which respective spectral transmittance curves of the color filters overlap each other, is set smaller than a predetermined value.

Preferably, peak transmittance of each of the color filters is set lower than a predetermined value. And, preferably, each of the color filters contains a material that lowers transmittance at wavelengths in a range, in which at least two of the respective spectral transmittance curves of the color filters overlap each other, to below a predetermined value.

Preferably, the transfer apparatus further comprises a substantially parallel rays generating element that is arranged between the light source and the transmission type image display device and is provided with a plurality of through-holes, wherein light from the light source is made to enter the transmission type image display device as the substantially parallel rays by the substantially parallel rays generating element.

Preferably, the substantially parallel rays generating element is provided over an entire surface of an image display area of the transmission type image display device. Or, preferably, the substantially parallel rays generating element is provided along one side of an image display area of the transmission type image display device, and the transfer apparatus further comprises a moving unit which moves the substantially parallel rays generating element along a side perpendicular to the one side of the image display area of the transmission type image display device, and light shielding masks that are provided before and after a moving direction of the substantially parallel rays generating element and shield light other than light from the through-holes of the substantially parallel rays generating element.

And, the present invention provides a transfer apparatus comprising a light source, and a transmission type image display device, wherein a photosensitive recording medium is arranged in series with the light source and the transmission type image display device along an advancing direction of light from the light source, and a display image having passed through the transmission type image display device is transferred onto the photosensitive recording medium directly or through an image projecting unit, wherein the light source is constructed so that a light emission peak exceeding a predetermined size does not exist in each range in which at least two of red, green, and blue spectral sensitivities of the photosensitive recording medium overlap each other.

Preferably, the light source is constructed so that only one of red light, green light, and blue light is emitted from the light source in each range in which at least two of the red, green, and blue spectral sensitivities of the photosensitive recording medium overlap each other. Or, preferably, the light source is constructed so that light from the light source exists only in each range other than each range in which at least two of the red, green, and blue spectral sensitivities of the photosensitive recording medium overlap each other.

In addition, the present invention provides a transfer apparatus comprising a light source, and a transmission type image display device, wherein a photosensitive recording medium is arranged in series with the light source and the transmission type image display device along an advancing direction of light from the light source, and a display image of the transmission type image display device is transferred onto the photosensitive recording medium by exposing the photosensitive recording medium using light having passed through the transmission type image display device, wherein the transfer apparatus further comprises a control unit for controlling a tone of gray to be recorded on the photosensitive recording medium by controlling at least one of a wavelength and a light quantity of light passing through the transmission type image display device.

Preferably, the control unit controls at least one of the wavelength and the light quantity of the light passing through the transmission type image display device by changing transmission characteristics of at least one of color filters of the transmission type image display device.

Preferably, the control unit is an absorption filter that is arranged between the light source and the photosensitive recording medium, and controls at least one of the wavelength and the light quantity of the light passing through the transmission type image display device by absorbing light from the light source in a predetermined wavelength band. And, preferably, the absorption filter is a dichroic mirror.

Preferably, the control unit controls the light quantity by controlling intensity of the light passing through the transmission type image display device or an exposure time during which the photosensitive recording medium is to be exposed.

Preferably, the control unit controls intensity of the light passing through the transmission type image display device by changing image data of an image to be displayed by the transmission type image display device.

Preferably, the light source is capable of controlling emission of red, green, and blue light independently of each other, and the control unit controls an exposure time of each of the red, green and blue light by the light source, during which the photosensitive recording medium is to be exposed, by controlling an emission time of each of the red, green, and blue light by the light source. Or, preferably, the light source irradiates white color, red, green and blue color filters are arranged on an optical path of the light source, and the control unit controls exposure time of each of red, green and blue color, during which the photosensitive recording medium is to be exposed, by controlling timings at which switching among the red, green, and blue color filters is performed.

According to the present invention, it becomes possible to prevent color mixture at the time of transferring an image displayed on an image display device onto a photosensitive recording medium and to reproduce the pure color of each of red, green, and blue. As a result, an image having superior color reproductivity can be obtained and in particular the gray tone can be properly reproduced. Consequently, it becomes possible to obtain a finished print having high image quality. Also, according to the present invention, it becomes possible to realize a transfer apparatus whose construction is simplified and whose size, weight, power consumption, and cost are capable of being truly reduced. Further, according to the present invention, a liquid crystal display having a high-definition screen with a high pixel density can be employed and a transfer image with higher clarity and higher definition can be obtained by suppressing color mixture.

DETAILED DESCRIPTION OF THE PREFERRED EMBODIMENTS

The transfer apparatus according to the present invention will now be described in detail based on preferred embodiments illustrated in the accompanying drawings.

First, a transfer apparatus according to a first aspect of the present invention will be described.

Figure 1:
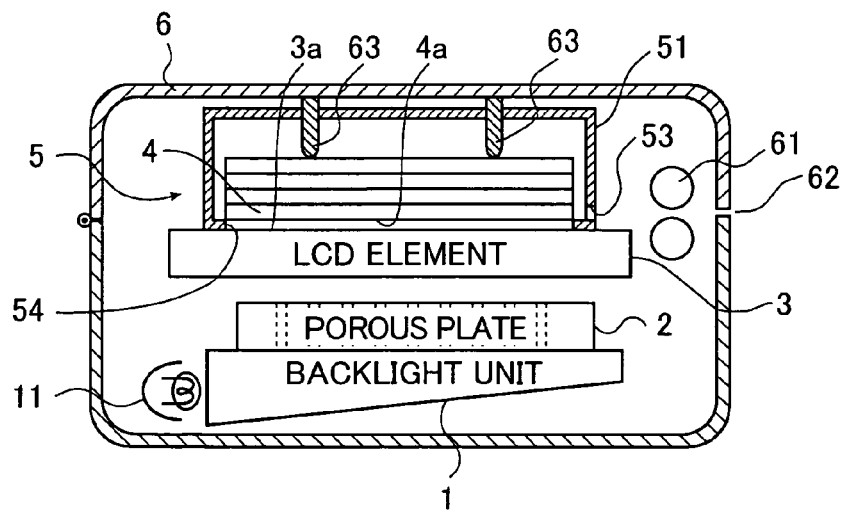
FIG. 1 is a schematic side cross-sectional view showing a transfer apparatus according to a first embodiment of a first aspect of the present invention.
Figure 2:
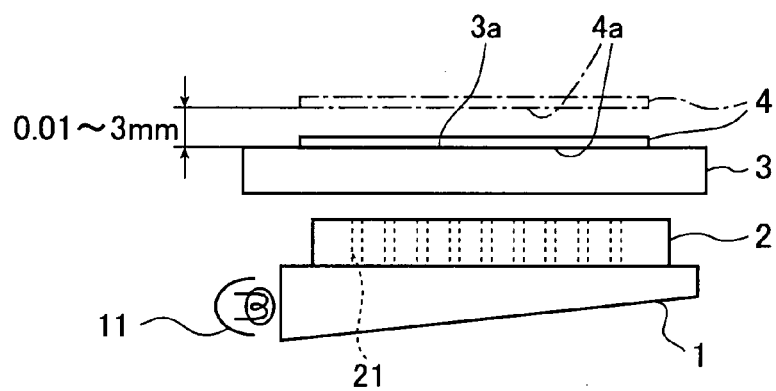
FIG. 2 is a schematic cross-sectional view showing a main portion of the transfer apparatus according to the first embodiment of the first aspect of the present invention.

FIG. 1 is a schematic side cross-sectional view showing a transfer apparatus according to a first embodiment of the first aspect of the present invention and FIG. 2 is a schematic cross-sectional view showing a main portion of the transfer apparatus according to the first embodiment of the first aspect of the present invention. Note that in FIG. 2, a film case 51 is omitted.

As shown in FIGS. 1 and 2, the transfer apparatus according to this embodiment includes a backlight unit 1 serving as a light source, a porous plate 2 for generating substantially parallel rays, a liquid crystal display device (hereinafter referred to as "LCD") 3 for displaying a digitally recorded image, a film pack 5 accommodating multiple photosensitive films 4 that are each a photosensitive recording medium in a film case 51 that is detachably attached, and a main body case 6 containing the backlight unit 1 of the LCD 3, the porous plate 2, the LCD 3, and the film pack 5. Note that the LCD 3 corresponds to the image display device of the present invention. The film case 51 is provided with an outlet 53 on one side surface in a longitudinal direction of the photosensitive film 4. Also, an opening portion 54 is formed on a surface of the film case 51 opposing the LCD 3.

Here, the porous plate 2, the LCD 3, and the photosensitive film 4 are arranged in series along a direction in which light from the backlight unit 1 advances. It is preferable that an image display surface 3a (display screen) of the LCD 3 and a photosensitive surface 4a of the photosensitive films 4 are arranged so as to oppose each other under a non-contact state, although the image display surface 3a and the photosensitive surface 4 may be placed under a contact (intimate contact) state from the viewpoint of color purity to be attained with the present invention. Also, if it is possible to expose the photosensitive film 4 with a display image having passed through the LCD 3 within a short time and to emit from the backlight unit 1 parallel rays having a sufficient intensity for required image sharpness, the porous plate 2 may be omitted. Further, the porous plate 2 may be omitted by transferring the LCD image through a projection unit such as a lens. The LCD 3 and the film case 51 intimately contact each other in their outer edge portions.

The backlight unit 1 serving as a light source is used to irradiate uniform light over the entire surface of the LCD 3 from behind thereof, and is a planar light source having a light emitting surface (illuminating surface) that is substantially the same as the image display surface 3a of the LCD 3. Also, the backlight unit 1 includes a rod-shaped lamp 11 such as a cold-cathode ray tube, and a backlight assembly having a light guide plate (not shown) for introducing the light emitted from the rod-shaped lamp 11 in a predetermined direction, a reflection sheet (not shown) for reflecting the light introduced by the light guide plate in a direction substantially perpendicular thereto, a diffusion sheet (not shown) or prism sheet for uniformalizing the light reflected by the reflection sheet, and the like.

There are no particular limitations regarding the backlight unit 1 used in this embodiment. It may be of any type so long as it is a planar light source that uniformly diffuses light emitted from the rod-shaped lamp 11 using the backlight assembly including the light guide plate, the reflection sheet, the diffusion sheet, the prism sheet, and the like. It is possible to use a publicly known conventional LCD backlight unit. Further, the backlight unit 1 used in this embodiment may be an LED array light source, a light source using an organic or inorganic EL panel, or the like so long as it is a planar light source that is capable of emitting light having a desired light intensity.

Figures 3A, 3B, 3C:
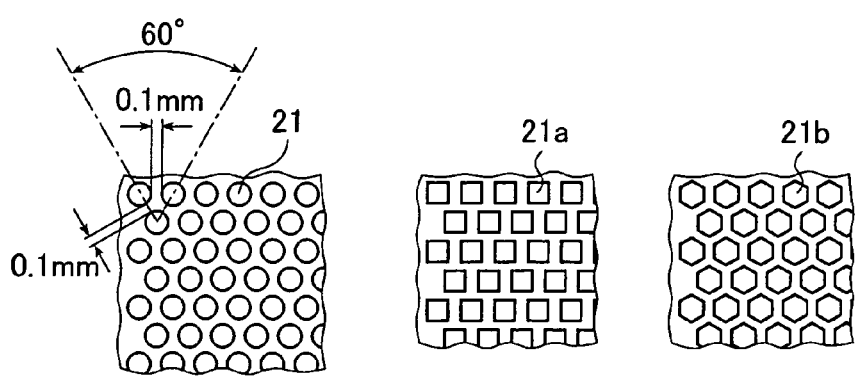
FIG. 3A is an enlarged front view of a part of a porous plate used in the transfer apparatus according to the first embodiment of the first aspect of the present invention.
FIG. 3B is a front view showing a first modification of the porous plate used in the transfer apparatus according to the first embodiment of the first aspect of the present invention.
FIG. 3C is a front view showing a second modification of the porous plate used in the transfer apparatus according to the first embodiment of the first aspect of the present invention.

FIG. 3A is a magnified front view of a part of the porous plate used in the transfer apparatus of this embodiment, FIG. 3B is a front view showing a first modification of the porous plate used in the transfer apparatus of this embodiment, and FIG. 3C is a front view showing a second modification of the porous plate used in the transfer apparatus of this embodiment. The porous plate 2 used in this embodiment is arranged between the backlight unit 1 and the LCD 3 as necessary, and serves as a substantially parallel rays generating element that converts light from the backlight unit 1 into substantially parallel rays (including parallel rays) and makes light entering the LCD 3 into parallel rays as much as possible. The porous plate 2 is obtained by forming many through-holes 21 having a predetermined shape and size at predetermined intervals in a rectangular plate having a predetermined thickness. As shown in FIG. 3A, in this embodiment, multiple through-holes 21 are formed in a zigzag manner so that the center of each through-hole 21 is arranged at the position of one of vertexes of a regular triangle. A distance of 0.1 mm is maintained between edge portions of the respective through-holes 21.

In addition, there are no particular limitations regarding the size of the through-holes 21. The diameter (in the case of a circle) or the equivalent diameter (in the case of an ellipse, a polygon, etc.) of the through-holes 21 in the porous plate 2 is preferably 5 mm or less. A thickness of the porous plate 2 is preferably three or more times the diameter or the equivalent diameter of the through-holes 21. Note that the above-mentioned equivalent diameter is a length expressed as "4×area/total side length (or total circumferential length)

". The diameter or equivalent diameter of the through-holes 21 of the porous plate 2 is set at 5 mm or less, and the thickness of the porous plate 2 is set three or more times the diameter or equivalent diameter of the through-holes 21, as described above. This is because those conditions are effective in obtaining parallel rays by means of the porous plate 2. In particular, the ratio of the thickness of the porous plate 2 to the diameter or equivalent diameter of the through-holes 21 is set five or more times, and more preferably seven to 25 times.

Further, there are no particular limitations regarding the configuration of the through-holes 21 provided in the porous plate 2. It may be, for instance, cylindrical, elliptic cylindrical, polygonal cylindrical, or the like. That is, a planar configuration of the through-holes 21 is not specifically limited and may be circular, elliptical, or polygonal, for instance. However, to facilitate the production, it is desirable for the configuration of the through-holes 21 to be circular or polygonal. Further, while it is desirable for the through-holes 21 to be parallel to the thickness direction of the porous plate 2, they may be substantially parallel to the thickness direction.

In addition, there are no particular limitations regarding the substantially parallel rays generating element used in this embodiment so long as it has the same function as the porous plate 2. That is, the substantially parallel rays generating element is not limited to the porous plate 2 shown in FIG. 3A. For instance, a square lattice 21a shown in FIG. 3B, a hexagonal lattice 21b shown in FIG. 3C, or the like can be used instead. However, from the viewpoint of easiness of the production, the porous plate 2 shown in FIG. 3A is preferable, for instance.

Further, in this embodiment, a distance between the porous plate 2 and the LCD 3 is set at preferably 0.05 mm to 10 mm, and more preferably 0.1 mm to 5 mm. This setting is made for the purpose of preventing a pattern of the through-holes 21 of the substantially parallel rays generating element, typified by the porous plate 2, from appearing in the form of a "shadow" due to diffused light. Note that the distance set in this manner is a condition under which the above-mentioned "shadow" can be prevented but clarity of a transfer image is not degraded.

Here, a material of the porous plate 2 is not specifically limited. It is possible, for instance, to use a metal plate such as an aluminum plate, a resin plate, or a carbon plate having a predetermined thickness. There are not any particular limitations regarding the thickness of the porous plate 2 either, and it may be appropriately selected in accordance with the requisite clarity of a transfer image or with the size of the image display surface 3a of the LCD 3 or the photosensitive surface 4a of the photosensitive film 4. In addition, as a method of producing the porous plate 2, a method with which porous sheets are stacked together, a molding method using a resin, or the like is practical. However, there are no particular limitations regarding this method so long as processing can be performed. The porous plate 2 may be produced by any processing methods including a method with which holes are formed through machining.

Further, a shape of arrangement and a pitch of arrangement of the multiple through-holes 21 formed in the porous plate 2 are not specifically limited so long as the through-holes 21 are uniformly arranged. For instance, the through-holes 21 may be arranged in a check or zigzag shape (close-packed shape), with the zigzag shape being preferable. Also, for instance, it is possible to use the lattice disclosed in JP 11-242298 A in which many through-holes are formed in a lattice manner. Alternatively, it is possible to use a narrow and long column-shaped porous plate disclosed in JP 2002-196424 A. This porous plate is produced to have a predetermined thickness and include many through-holes arranged in one row (or multiple rows) along the longitudinal direction, and is moved in the longitudinal direction of the backlight while blocking light in front of and behind in its moving direction. In addition, it is preferable that the arrangement pitch of the through-holes 21 is reduced as much as possible. For instance, a distance between the through-holes 21 (distance between outer edge portions of the through-holes 21) is set at preferably 0.05 to 0.5 mm, and more preferably 0.05 to. 0.3 mm.

In addition, it is desirable to provide a reflection preventing film over the entire surface of the porous plate 2 including inner surfaces of the through-holes 21. There are no particular limitations regarding this reflection preventing film so long as its reflectance is equal to or lower than a predetermined value. For instance, it is possible to use a plated black film, a blackened film, a coated black film, and the like. In the present invention, it is preferable that the above-mentioned reflectance is set at 2% or less. This is because if the reflectance is set in this manner, scattered light other than parallel rays entering from the backlight unit 1 can be efficiently absorbed, so that only substantially parallel rays (including parallel rays) can be efficiently emitted from the backlight unit 1 and caused to enter the LCD 3. Note that the reflectance can be measured at a wavelength of 550 nm using a spectroreflectometer "MPC3100" manufactured by Shimadzu Corporation, for instance.

The LCD 3 is a transmission type image display device for displaying a digitally recorded image, and is connected to a digital image data supply section of a digital still camera, a digital video camera, a personal computer, or the like to display a display image as a transmitted image in accordance with digital image data supplied. Also, the digital image data supply section of a digital camera or the like connected to the LCD 3 is constituted so that an arbitrary image can be selected and supplied out of images prepared beforehand. Note that, other than the above-mentioned case, the digital image data to be supplied to the LCD 3 may also be data read from a transparent original or a reflection original with a scanner or the like. In addition, the LCD 3 may be of any type so long as it can display an image as a transmitted image. It may be of a type that displays an image on the basis of analog image data of an image photographed by an ordinary video camera rather than digital image data.

Note that a predetermined distance is provided between the LCD 3 and the porous plate 2. As stated above, this distance is preferably set at 0.05 mm to 10 mm, and more preferably 0.1 mm to 5 mm. It is desirable that the distance is adjustable to an arbitrary dimension.

Figure 4:
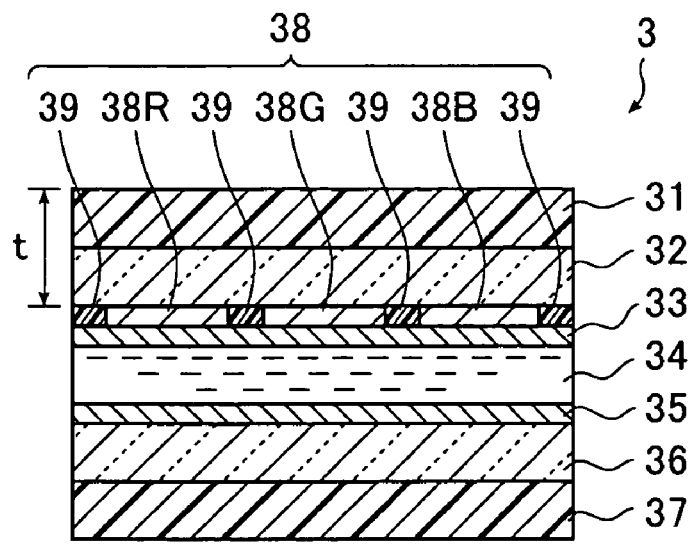
FIG. 4 is a cross-sectional view showing a structure of a transmission type liquid crystal display element used in the transfer apparatus according to the first embodiment of the first aspect of the present invention.

FIG. 4 is a cross-sectional view showing a construction of the transmission type liquid crystal display element used in the transfer apparatus of this embodiment. As shown in FIG. 4, the LCD 3 has a structure in which a film-like polarizing plate (hereinafter also referred to as "polarizing film") 31, a glass substrate 32, an electrode 33, a liquid crystal layer 34, an electrode 35, a glass substrate 36, and a film-like polarizing plate 37 are stacked together from the photosensitive film 4 side toward the porous plate 2 side (the backlight unit 1 side), with the liquid crystal layer 34 being held by the glass substrates 32 and 36 and the polarizing plates 31 and 37 from both sides thereof. Also, a RGB color filter 38 is provided between the glass substrate 32 and the electrode 33. This color filter 38 is formed by three color filters 38R,

38G, and 38B respectively corresponding to RGB colors and a black matrix 39. Needless to say, the LCD 3 additionally has an orientation film (not shown) and the like, as is well known. Here, for instance, in the case of a TFT type LCD, the electrode 33 serves as a common electrode and the electrode 35 functions as a display electrode, a gate electrode, or the like. Note that resin substrates or the like may be used in place of the glass substrates 32 and 36.

As the color filters 38R, 38G, and 38B respectively corresponding to RGB colors of the LCD 3 of this embodiment, there are used colors filters whose maximum values of transmittance in ranges in which their spectral transmittance curves overlap each other, are smaller than a predetermined value. With this construction, the color mixture of the three primary colors (R, G, and B) is reduced and the color purity of each color of the LCD 3 is improved. As a result, it becomes possible to obtain a high-quality print.

Hereinafter, there will be described, in a specific manner, how the maximum transmittance values in the ranges in which the spectral transmittance curves of the RGB color filters 38R, 38G, and 38B overlap each other, are set smaller than the predetermined value.

Figure 5:
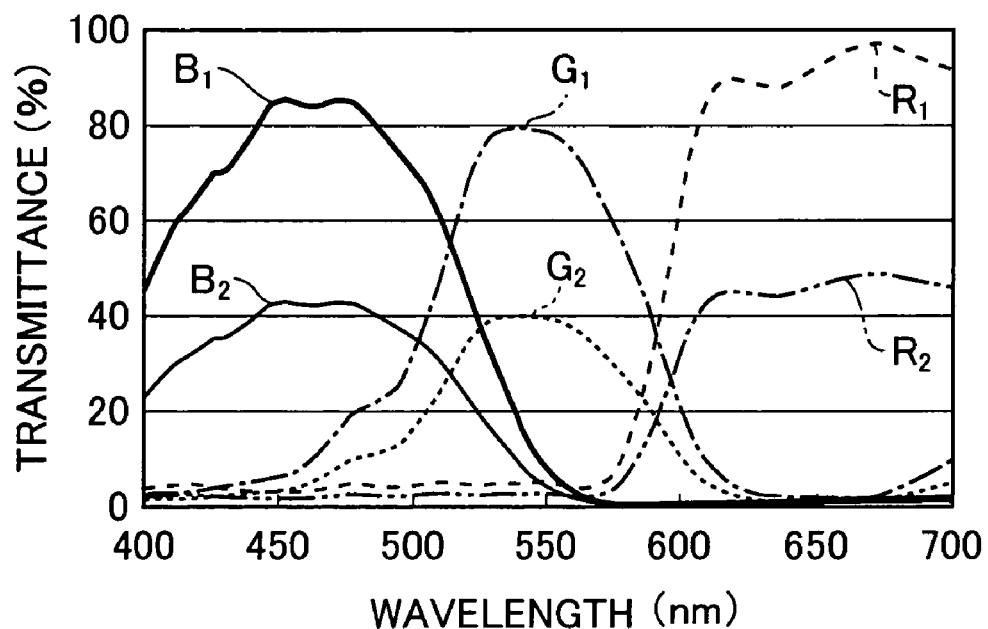
FIG. 5 is a graph showing spectral transmittance curves of RGB color filters with transmittance as ordinate against wavelengths as abscissa.

In FIG. 5, the spectral transmittance of the RGB color filters is plotted with transmittance as ordinate against wavelengths as abscissa. The spectral transmittance curves $R_1$, $G_1$, and $B_1$ shown in this drawing are examples of the color filters of the LCD. For instance, as shown in FIG. 5, each of the color filters of the LCD is produced so as to have a wide transmission wavelength range, so that the transmission ranges of the R light and the G light overlap each other in the vicinity of a wavelength of 600 nm and the transmission ranges of the B light and the G light overlap each other in the vicinity of a wavelength of 500 nm. In each of those overlapping ranges, both of light in one color and light in another color are allowed to pass through the filters. In this case, the maximum value of the transmittance in the range in which the spectral transmittance curve $B_1$ and the spectral transmittance curve $G_1$ overlap each other, is around 55% and the maximum value of the transmittance in the range in which the spectral transmittance curve $R_1$ and the spectral transmittance curve $G_1$ overlap each other, is around 40%.

In this aspect of the present invention, the maximum value of the transmittance in those ranges in which the spectral transmittance curves $R_1$, $G_1$, and $B_1$ overlap each other, is set smaller than the predetermined value. In more detail, the maximum value of the transmittance in the ranges is preferably set at 50% or less, more preferably 30% or less, and still more preferably 20% or less. Note that it is ideal that the maximum value of the transmittance in the mutually overlapping ranges is set at 0%. By regulating the maximum value of the transmittance in the ranges in which the spectral transmittance curves $R_1$, $G_1$, and $B_1$ mutually overlap each other, to 50% or less in this manner, the color purity of each color of light emitted from the LCD is improved. As a result, it becomes possible to obtain a finished print having high image quality.

Further, the spectral transmittance characteristics of the color filters for respective colors also depend on the spectral sensitivity characteristics of a photosensitive material. Therefore, it is necessary to adjust the spectral transmittance characteristics of the color filters of the LCD 3 in accordance with the spectral sensitivity characteristics of the photosensitive material. In the case of the photosensitive material shown in FIG. 25, the spectral sensitivity curves of B light and G light overlap each other in a wavelength range of 460 to 510 nm and the spectral sensitivity curves of R light and G light overlap each other in a wavelength range of 570 to 600 nm. In this case, it is necessary to lower the transmittance of the color filters of the LCD 3 in those wavelength ranges of 460 to 510 nm and 570 to 600 nm.

In this embodiment, by increasing the density of each color filter, the transmittance of each color filter is lowered in an entire wavelength range. With this construction, the maximum value of the transmittance in the ranges in which the spectral transmittance curves overlap each other, is lowered. Accordingly, it becomes possible to set the maximum value of the transmittance in the overlapping ranges smaller than the predetermined value without changing the spectral transmittance characteristics of the color filters. For instance, as shown in FIG. 5, when the densities of the color filters of which the spectral transmittance characteristics are indicated by the spectral transmittance curves $R_1$, $G_1$, and $B_1$ are respectively doubled, the transmittance in the entire wavelength range is reduced to half. In this case, the spectral transmittance characteristics of the respective color filters become as indicated by spectral transmittance curves $R_2$, $G_2$, and $B_2$.

The density is doubled in the manner described above, so that it becomes possible to reduce the maximum value of the transmittance in the overlapping range of the B color filter and the G color filter from around 55% to around 30% and to reduce the maximum value of the transmittance in the overlapping range of the G color filter and the R color filter from around 40% to around 20%. As described above, in this embodiment, by doubling the densities of the color filters, the maximum values of the transmittance in the ranges in which the spectral transmittance curves $R_2$, $G_2$, and $B_2$ overlap each other, are set at 30% or less.

Figure 24:
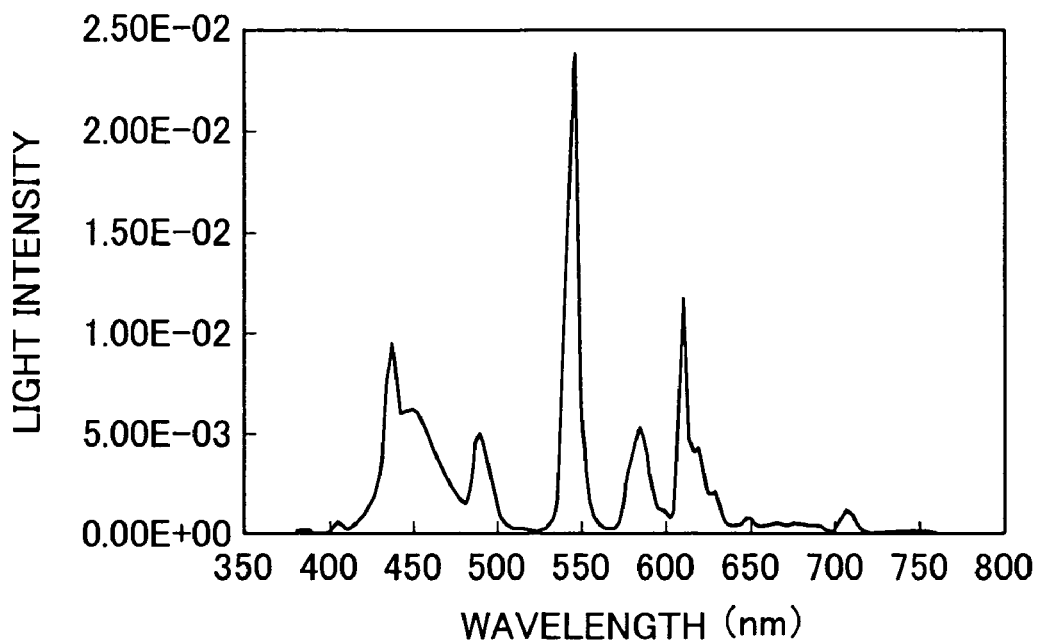
FIG. 24 is a graph in which a spectrum waveform of a backlight light source of an LCD is plotted with light intensity as ordinate against wavelengths as abscissa.
Figure 25:
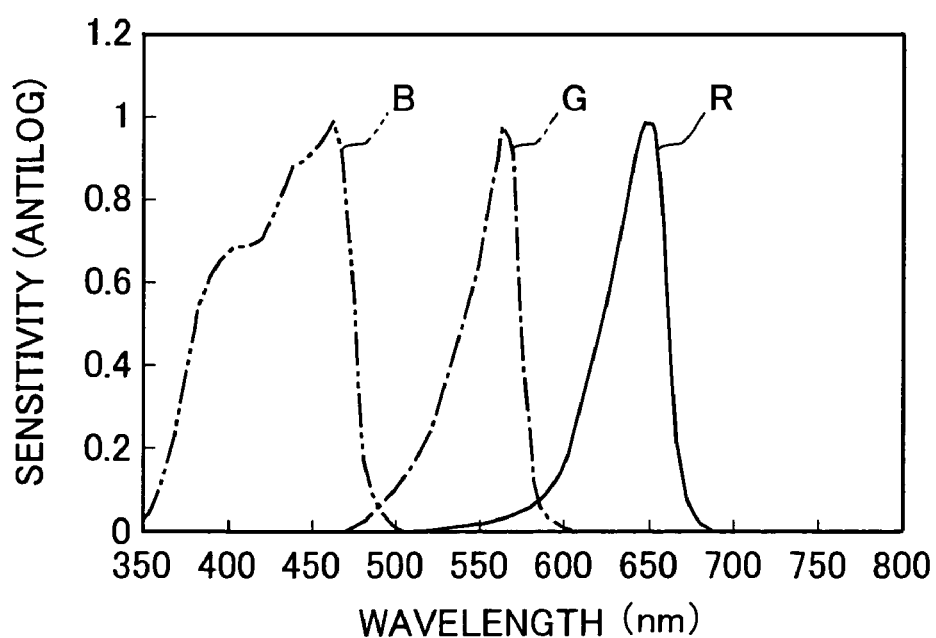
FIG. 25 is a graph in which spectral sensitivity characteristics of a photosensitive film with respect to R light, G light, and B light are plotted with sensitivity as ordinate against wavelengths as abscissa.
Figure 26:
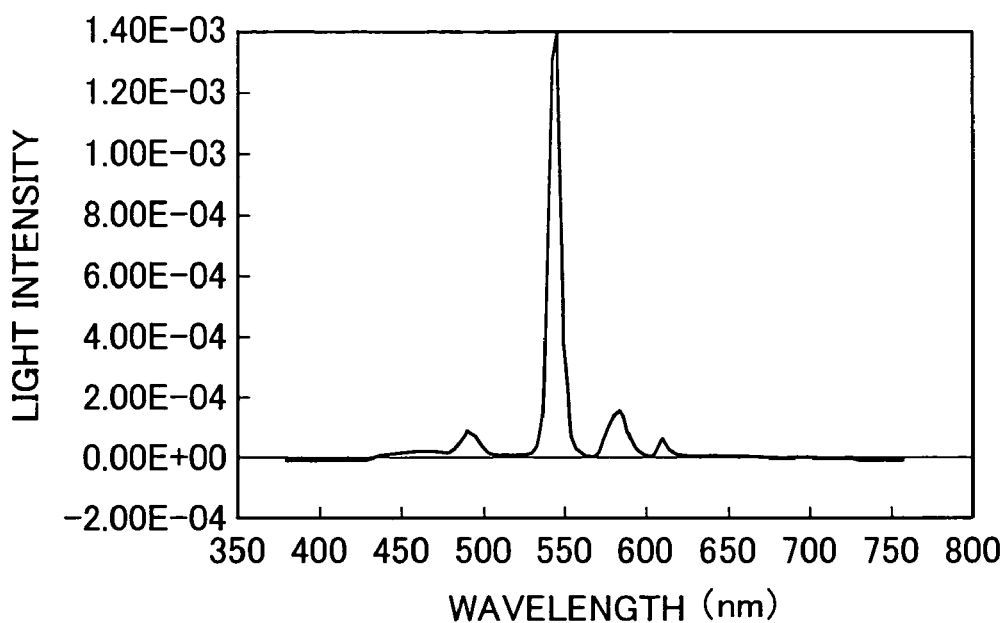
FIG. 26 is a graph in which spectral intensity characteristics of light having passed through a G color filter of an LCD are plotted with light intensity as ordinate against wavelengths as abscissa.

When the rod-shaped lamp 11 has the spectral intensity characteristics shown in FIG. 24 and the photosensitive film 4 having the spectral sensitivity characteristics shown in FIG. 25 is exposed, for instance, the R density becomes 0.46, the G density becomes 0.37, and the B density becomes 0.32. Also, when the color filters of the LCD 3 have the spectral transmittance characteristics shown in FIG. 5 and the photosensitive film 4 is exposed by displaying gray on the LCD 3, for instance, the R density, G density, and B density of the gray formed on the photosensitive film 4 become 0.91, 0.58, and 0.39, respectively. The gray obtained in this manner loses balances among the three primary colors (R, G, and B) and is very strongly tinged with blue. In this case, it is preferable that the color mixture of R, G, and B are suppressed and the gray tone is adjusted by most significantly lowering the transmittance of the B color filter and next most significantly reducing the transmittance of the G color filter.

Further, the LCD 3 is not limited to the structure shown in FIG. 4. That is, any type of LCD that has a well-known conventional liquid crystal display mode and is driven by a well-known conventional driving system can be used so long as it can display an image. In the LCD used as the LCD 3, however, the total thickness of the polarizing film 31 and the glass substrate 32 on the photosensitive film 4 side needs to be set in the manner to be described later. Examples of the liquid crystal display mode include those using a polarizing plate such as TN mode, STN mode, CSH mode, FLC mode and OCB mode. Also, examples of the driving system include active matrix driving systems of a TFT type and a diode type, direct matrix driving systems comprised of XY stripe electrodes, and the like.

In addition, there are no specific limitations regarding the size of the LCD 3, and any size may be adopted. It is possible to select an appropriate size in accordance with the size of a photosensitive film. Also, there are no particular limitations regarding a dot size of each RGB pixel of the LCD 3. However, in order to obtain a clearer photographic image with high quality, it is preferable that the size of each pixel at least on the shorter side is set at 0.2 mm or less. This is because if the size of each pixel at least on the shorter side is set at 0.2 mm or less, a clearer transfer image can be obtained.

It should be noted here that there are no particular limitations regarding the number of pixels or pixel density of the LCD 3. In order to transfer and obtain a high-quality image of high definition and high clarity, it is preferable to use an LCD having a high-definition screen with a small RGB pixel dot size of each RGB pixel that is recently commercialized. Examples of such an LCD include TFT type LCDs such as UXGA (10.4 inches, 1200×1600 pixels) and XGA (6.3 and 4 inches, 1024×768 pixels).

Note that, in the LCD 3 used in this embodiment, it is desirable that at least the total thickness t of the substrate 32 and the polarizing film 31 on the photosensitive film 4 side is as small as possible. It is preferably set at 1.0 mm or less, more preferably 0.8 mm or less, and still more preferably 0.6 mm or less.

Note that it is more preferable that the total thickness of the substrate 36 and the polarizing film 37 on the backlight unit 1 (the porous plate 2) side is also as small as possible. It is preferably set at 1.0 mm or less, more preferably 0.8 mm or less, and still more preferably 0.6 mm or less. In addition, there are no particular limitations regarding a lower limit value of the total thickness. However, for instance, a limit of reducing the thickness of the glass substrate 32 itself is considered to be approximately 0.5 mm, so that the lower limit value of the total thickness may be set at 0.5 mm or more. Note that the total thickness is not limited to this. As a structure for realizing the above-mentioned conditions, it is also effective to consider the use of a resin substrate instead of the glass substrate. In this case, the lower limit value of the total thickness that is approximately 0.5 mm can be further reduced.

Hereinafter, a reason why the total thickness t of the substrate 32 and the polarizing film 31 on the photosensitive film 4 side is set at 1.0 mm or less in this embodiment will be described.

This condition concerning the total thickness is equivalent to suppressing diffusion of projected light in a section from the backlight unit 1 to the LCD 3 and is based on a fact that a clearer transfer image can be obtained even if the LCD 3 and the photosensitive film 4, strictly speaking, the image display surface 3a of the LCD 3 and the photosensitive surface 4a of the photosensitive film 4 are held in a non-contact state.

That is, in the image transfer apparatus according to this aspect of the present invention, the image display surface 3a of the LCD 3 and the photosensitive surface 4a of the photosensitive film 4 are spaced apart from each other by a predetermined distance and held in the non-contact state. This condition of holding them in the non-contact state is a condition necessary to achieve better usefulness and realize a transfer apparatus that is actually easy to handle with a simple structure. However, this arrangement is rather disadvantageous from the viewpoint of obtaining a clear transfer image because it facilitates diffusion of light between the image display surface 3a of the LCD 3 and the photosensitive surface 4a of the photosensitive film 4.

Thus, in the present invention, the disadvantage due to the above-mentioned non-contact state (increase in diffusion of light) is compensated for by increasing the color purity of light emitted from the LCD 3 through adjustment of the spectral characteristics of the color filters of the LCD3 and control of the spectral characteristics of the light emitted from the LCD, as will be described later. In this manner, the image quality is further improved. Moreover, the disadvantage is recovered by the above-mentioned condition concerning the total thickness and an advantage of setting the thickness of the porous plate 2 three or more times the diameter or the equivalent diameter of the through-holes 21 (suppression of diffusion of light).

Figure 22A:
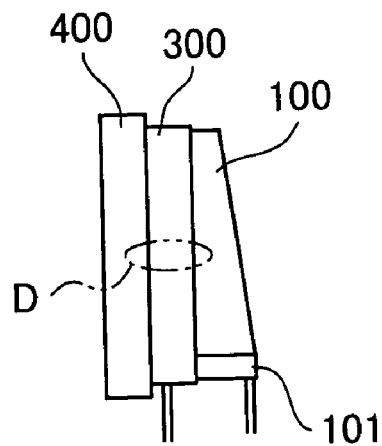
FIG. 22A is a side view showing a printing apparatus disclosed in JP 11-242298 A.
Figure 22B:
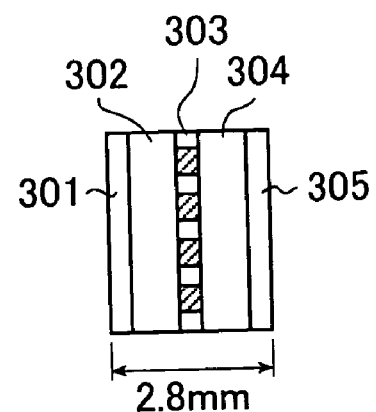
FIG. 22B is an enlarged view of a portion D of FIG. 22A.
Figure 23:
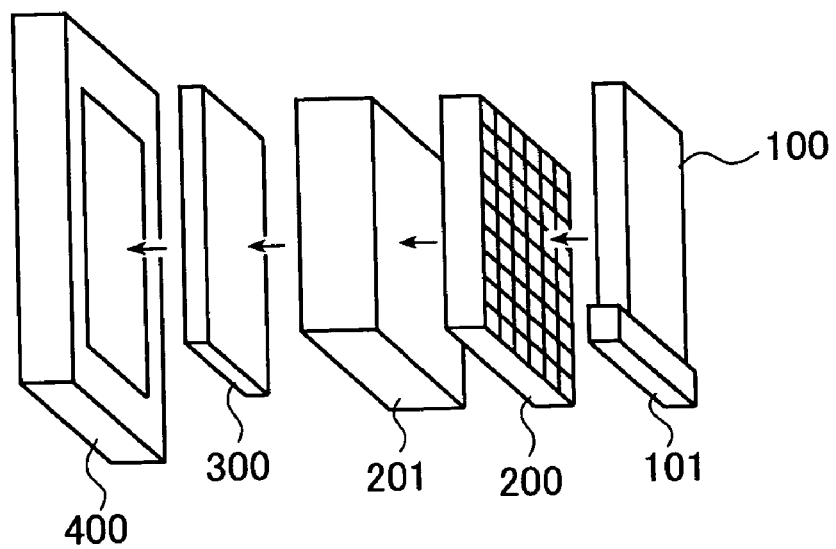
FIG. 23 is a perspective view showing a printing apparatus of another embodiment disclosed in JP 11-242298 A.

By the way, as described above, the LCD 300 with a thickness of approximately 2.8 mm is used in the conventional printing apparatus shown in FIGS. 22A and 22B and disclosed in JP 11-242298 A. As shown in FIG. 22B, the LCD 300 is formed by the two polarizing plates 301 and 305, the two substrates 302 and 304, and the liquid crystal layer 303 that is held by them. Although not disclosed in JP 11-242298 A, the total thickness of the liquid crystal layer along with one substrate 301 (305) and one polarizing plate 302 (304) on one side is considered to be approximately 1.3 mm to 1.4 mm because the thickness of the liquid crystal layer itself is generally defined as approximately 0.005 mm (see "Color TFT Liquid Crystal Display" p207, published by Kyoritsu Shuppan Co., Ltd.).

Here, a degree of diffusion of light is proportional to a distance, so that when the above-mentioned thickness of 1.3 mm to 1.4 mm is reduced to half, it can be assumed that the degree of diffusion is also reduced to half and the value of "expansion by approximately 0.09 mm for one side" described in the section of the related art is reduced to half, that is, approximately 0.04 mm to 0.05 mm. However, with the degree of diffusion in this order, overlapping of adjacent dots occurs in an LCD having a fine dot size such as the latest UXGA or XGA, as described in the section of the related art.

That is, if the degree of diffusion is simply reduced to approximately 0.04 mm to 0.05 mm, overlapping of dots occurs, blurring of colors due to this arrangement develops, and only an unclear image can be obtained. However, as described in JP 2002-196426 A, the inventors of the present invention have found that, by reducing the total thickness of the substrate 32 and the polarizing film 31 of the LCD 3 at least on the photosensitive film 4 side to 1.0 mm or less, blurring of colors due to the overlapping of dots is eliminated and a clear transfer image can be obtained even in an LCD having a fine dot size such as UXGA or XGA. Moreover, as described above, by adjusting the spectral characteristics of the color filters, color mixture may be avoided. Thus, only a light component in a color required for exposure and printing can be allowed to enter the photosensitive film 4. As a result, in the LCD 3 having a fine dot size such as UXGA or XGA, blurring of colors is further eliminated and a clear transfer image can be obtained when compared with a case where the same distance is maintained between the LCD 3 and the photosensitive film 4.

This embodiment is structured such that the film case 51 accommodates multiple photosensitive films 4 and the photosensitive surface 4a of the photosensitive film 4 is arranged so as to oppose the image display surface 3a of the LCD 3 with a predetermined distance in-between (preferably, 0.01 mm to 3 mm). Also, in this embodiment, it is possible to load one set (pack) of the multiple photosensitive films 4 in the film case 51 mounted inside the main body case 6 or to load the film pack 5 in which the multiple photosensitive films 4 are accommodated in the detachable film case 51, in the main body case 6 as it is. However, it is desirable to adopt a construction in which the film pack 5 including the film case 51, that is, the film case 51 itself accommodating the multiple photosensitive films 4 can be loaded.

The photosensitive film 4 is used as the photosensitive recording medium in the present invention. Any type of a photosensitive recording medium can be used so long as it allows formation of a visible positive image by exposure and printing of a transmitted display image on the LCD 3, and there are no particular limitations in this regard. For instance, it is preferable to use a so-called instant photographic film. Examples of the photosensitive film 4 used as the photosensitive recording medium include "instax mini" and "instax" (both manufactured by Fuji Photo Film Co., Ltd.), which are mono-sheet-type instant photographic films. Such instant photographic films are commercially available in the form of a film pack in which a predetermined number of films are set or packed in a film case.

Thus, in the present invention, if an arrangement is possible in which the distance between the photosensitive surface 4$a$ of the photosensitive film 4 and the image display surface 3$a$ of the LCD 3 satisfies a condition to be described later, it is possible to load the film pack 5 as it is in the main body case 6, as shown in FIG. 1.

Also, in this embodiment, when the film pack 5 is used, an opening area of the opening portion 54 of the film case 51 is set larger than the image forming area of the photosensitive film 4, for instance. Needless to say, an area defined by an outward configuration of the LCD 3 is larger than the image display area of the LCD 3. In this embodiment, it is preferable that the image display area of the LCD is the same as the image forming area of the photosensitive film 4. In this case, a size relationship among sizes of respective portions is as follows: the opening area of the opening portion 54 of the film case 51 is larger than the image forming area of the photosensitive film 4 and the area defined by the outward configuration of the LCD 3 is usually larger than the opening area of the opening portion 54 of the film case 51. However, it is extremely preferable that the opening area of the opening portion 54 of the film case 51 is larger than the area defined by the outward configuration of the LCD 3.

Figure 6:
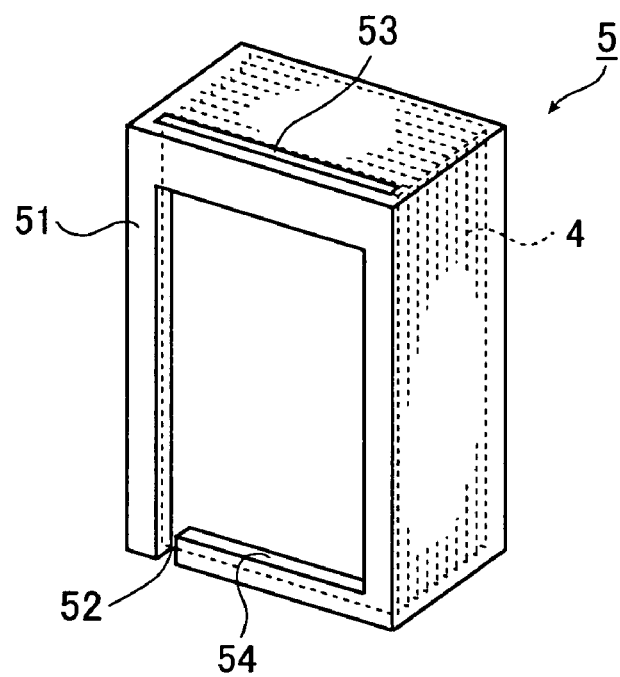
FIG. 6 is a perspective view showing an example of a structure of a film pack 5 used in the transfer apparatus according to the first embodiment of the first aspect of the present invention.

FIG. 6 is a perspective view showing an example of the structure of the film pack 5 used in the transfer apparatus of this embodiment. At one end portion of the film case 51 of the film pack 5 having the construction shown in FIG. 6, there is provided a cutout 52 that admits the approach of a claw member (claw) for extracting the photosensitive film 4 from the film pack 5 (from the film case 51 thereof). The photosensitive film 4 that has undergone exposure is extracted through an outlet 53 of the film case 51 of the film pack 5 by the claw member, and is transferred by a conveying mechanism (not shown) to a processing step.

Here, the "processing step" in this embodiment means pushing open a processing liquid (developer) tube (not shown) provided at one end of the photosensitive film 4 in advance and causing the developer to be uniformly spread over the entire inner surface of the photosensitive film 4. It is executed substantially simultaneously with the extraction of the photosensitive film 4 from the film pack 5 and the conveyance thereof. After the processing step, the photosensitive film 4 is sent to the outside of the apparatus through an outlet port 62 of the main body case 6 (see FIG. 1).

As is well known, an instant photographic film of this type makes it possible to form a complete image for appreciation in about several tens of seconds after the above-mentioned processing step is conducted. Thus, in the transfer apparatus of the present invention, the function of performing up to the above-mentioned processing step is required. After one photosensitive film (film sheet) is sent out, the next photosensitive film appears, thereby realizing a preparation state in which the next exposure (transfer) is possible.

It should be noted here that regarding the method of handling this film pack described above, it is possible to refer to the instant camera using an instant photographic film disclosed in commonly assigned JP 04-194832 A.

By the way, in the transfer apparatus of this aspect of the present invention, as described above, in order to realize an apparatus that is actually easy to handle, the LCD 3 and the photosensitive film 4, strictly speaking, the image display surface 3$a$ of the LCD 3 and the photosensitive surface 4$a$ of the photosensitive film 4 are held in a non-contact state in which they are spaced apart from each other by a predetermined distance. Also, in the transfer apparatus according to this aspect of the present invention, as shown in FIG. 2, the distance between the image display surface 3$a$ of the LCD 3 and the photosensitive surface 4$a$ of the photosensitive film 4 is preferably set at 0.01 mm to 3 mm, and more preferably 0.1 mm to 3 mm.

As described above, the arrangement where the LCD 3 and the photosensitive film 4 are spaced apart from each other is rather disadvantageous from the viewpoint of obtaining a clear transfer image but is a condition necessary to realize an apparatus that is actually easy to handle by facilitating the conveyance of the photosensitive film 4. However, it is possible to recover this disadvantage by an advantage of suppression of diffusion of light emitted from the LCD surface 3$a$ through regulation of the total thickness $t$ of the substrate 32 and the polarizing film 31 of the LCD 3 on the photosensitive film 4 side. It is also possible to recover the disadvantage by an advantage of suppression of light diffusion through the setting of the thickness of the porous plate 2 three or more times the diameter or equivalent diameter of the through-holes 21 of the porous plate 2.

In the transfer apparatus of this embodiment, it is preferable that the size of the image displayed on the LCD 3 is substantially the same as the size of the image transferred to the photosensitive film 4. This is due to the fact that, in this embodiment, by adopting a direct transfer system in which no enlargement or reduction using a lens system is performed, it becomes possible to achieve size and weight reductions of the apparatus and the like.

The main body case 6 is a case containing the above-mentioned components of this embodiment, that is, the backlight unit 1, the porous plate 2, the LCD 3, the film pack 5 (or the film case 51), a pair of rollers 61 for transferring an exposed film and spreading out the processing liquid, and the like. In the main body case 6, the pair of rollers 61 for transferring an exposed film and spreading out the processing liquid are mounted at a position at which they face the exposed film extraction outlet 53 of the loaded film pack 5 (or the film case 51). Also, the main body case 6 has, at a position facing this pair of rollers 61, the outlet 62 through which the exposed photosensitive film 4 is extracted from the main body case 6. Further, the main body case 6 is provided with back-up depressing pins 63 that are each inserted from openings on the back side of the exposed film pack 5 to press the photosensitive films 4 against the front edge of the film case 51, that is, the LCD 3 side.

Although not shown, it goes without saying that the transfer apparatus of this embodiment includes a drive source (motor) for driving the roller pair 61, a power source for driving the drive source and lighting up the rod-shaped lamp 11 of the backlight unit 1, electrical equipment for controlling those components, a data processing device that receives digital image data for displaying an image on the LCD 3 from a digital image data supply section and converts the received data into image data for LCD display, a control unit, and the like. The transfer apparatus according to this embodiment is basically constructed in the manner described above.

In this embodiment, an image supplied from the digital image data supply section is displayed on the LCD 3. Next, the rod-shaped lamp 11 is turned on, thereby causing substantially parallel rays to perpendicularly enter the image display surface 3a of the LCD 3 through the porous plate 2. Then, the image displayed on the LCD 3 is printed on the photosensitive film 4 through exposure. As a result, a transfer image is formed on the photosensitive film 4.

In the transfer apparatus of this embodiment, the spectral transmittance characteristics of the color filters of the LCD 3 are adjusted so that the maximum value of transmittance in each range in which the spectral transmittance curves of the color filters overlap each other, becomes smaller than the predetermined value. As a result, it becomes possible to enhance the color purity of the three primary colors and realize superior color reproductivity by suppressing the color mixture of the three primary colors emitted from the LCD 3. Accordingly, a finished print having high image quality can be obtained.

Next, a second embodiment of the first aspect of the present invention will be described. This second embodiment differs from the first embodiment in the structure of the color filters. Other constructions are the same as those in the first embodiment and therefore the detail description thereof will be omitted. Note that in this embodiment, the illustration of the transfer apparatus is omitted. In the first embodiment, the densities of the color filters are increased in order to narrow the ranges in which the spectral transmittance curves of the color filters overlap each other. In this embodiment, however, a material for absorbing light in the mutually overlapping wavelength ranges is added to the color filters.

In this embodiment, in order to add such a material that absorbs light in the mutually overlapping wavelength ranges, for instance, it is possible to use a method with which a material used to produce a yellow color filter is added to the R and G color filters and a material used to produce a violet color filter is added to the B color filter. By adding predetermined materials in this manner, light in wavelength ranges other than transmission wavelength ranges is diffused or absorbed. As a result, the maximum value of transmittance of light having wavelengths in the overlapping ranges is set smaller than the predetermined value.

The transmittance in each range in which the spectral transmittance curves overlap each other, is set smaller than the predetermined value in this manner, so that it becomes possible to set the maximum value of the transmittance in this range smaller than the predetermined value and to suppress the color mixture.

Figure 7:
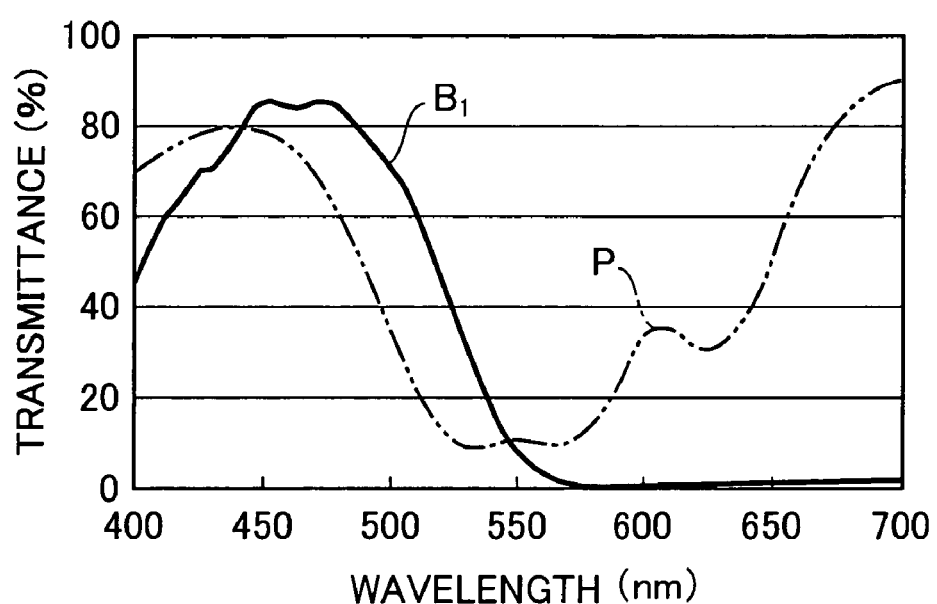
FIG. 7 is a graph showing spectral transmittance characteristics of the B color filter and the spectral transmittance characteristics of a color filter added to the B color filter with transmittance as ordinate against wavelengths as abscissa.

FIG. 7 is a graph in which the spectral transmittance characteristics of the B color filter and the spectral transmittance characteristics of a color filter added to this B color filter are plotted with transmittance as ordinate against wavelengths as abscissa. Note that the spectral transmittance curve $B_1$ of the B color filter shown in FIG. 7 is the same as the spectral transmittance curve $B_1$ shown in FIG. 5.

As shown in FIG. 7, when the component of a color filter having spectral transmittance characteristics indicated by a spectral transmittance curve P is added to the B color filter, for instance, the transmittance of the B color filter in a wavelength range of 500 to 550 nm is lowered. The spectral transmittance curve P indicates high transmittance in a wavelength range of 530 nm or shorter. However, the transmittance of the B color filter is determined by the addition ratio of the component described above multiplied to the B color filter, so that the absolute amount of the transmission light quantity of the B color filter is reduced at the green (G) wavelength or longer.

As shown in FIG. 5, the spectral transmittance curves of the B color filter and the G color filter overlap each other in a wavelength range of 500 to 550 nm. However, when the maximum value of the transmittance of the B color filter in the wavelength range of 500 to 550 nm is set smaller than the predetermined value, the range in which the spectral transmittance curves of the B and G color filters overlap each other is reduced and the maximum value of the transmittance in this range is reduced. As a result, it becomes possible to suppress the color mixture of respective colors emitted from the LCD and to improve the color purity. Such adjustment is also performed for the G color filter and the R color filter.

In the transfer apparatus of this embodiment, as in the first embodiment, the spectral transmittance characteristics of the color filters for respective colors of the LCD 3 are adjusted so that the maximum value of the transmittance in each range in which the spectral transmittance curves of the color filters overlap each other is set smaller than the predetermined value. As a result, it becomes possible to suppress the color mixture of the three primary colors emitted from the LCD 3, to increase the color purity of the three primary colors, and to enhance the color reproductivity. Accordingly, a finished print having high image quality can be obtained.

It should be noted here that in the first and second embodiments described above, the construction of the transfer apparatus is not specifically limited. For instance, it is possible to obtain a transfer apparatus having a construction to be described below.

Figure 8:
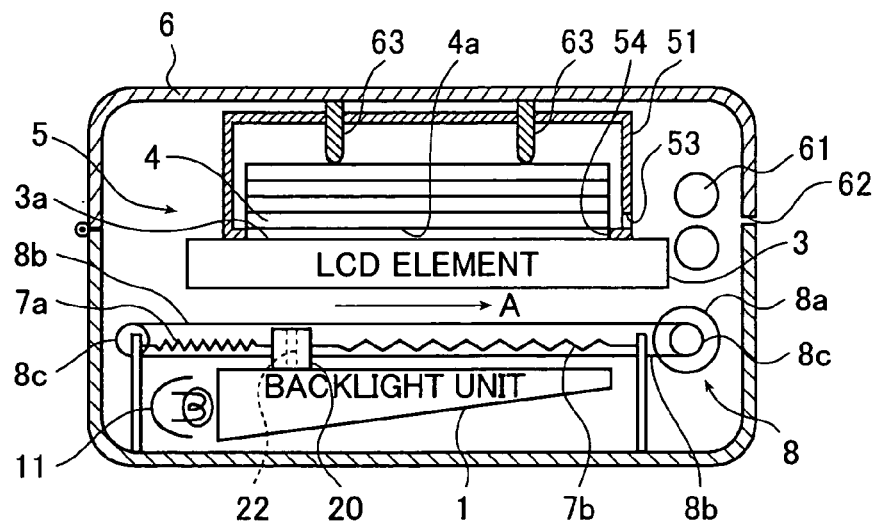
FIG. 8 is a schematic cross-sectional view showing a first modification of the transfer apparatus according to the first embodiment of the first aspect of the present invention.
Figure 9:
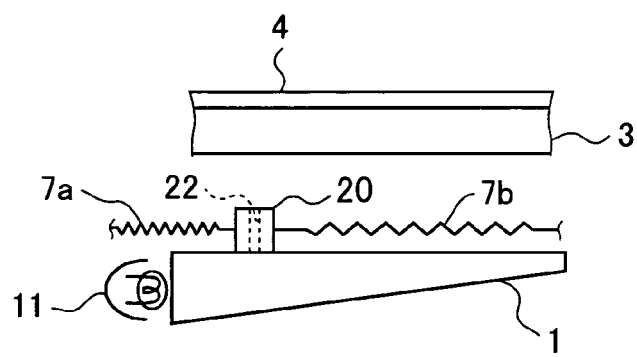
FIG. 9 is a schematic cross-sectional view showing a main portion of the transfer apparatus shown in FIG. 8.

FIG. 8 is a schematic cross-sectional view showing a first modification of the transfer apparatus according to the first embodiment of the present invention, and FIG. 9 is a schematic cross-sectional view showing a main portion of the transfer apparatus shown in FIG. 8. Note that in this modification, the same components as in the first embodiment shown in FIGS. 1 to 6 are given the same reference numerals and the detailed description thereof will be omitted.

This modification differs from the first embodiment in that the porous plate 20 is not provided over the entire surface of the image display area, the through-holes 22 of the porous plate 20 are formed in one row, and a moving unit is provided which moves the porous plate 20 in a direction A perpendicular to an arrangement direction of the through-holes 22. Other constructions are the same as those in the first embodiment and therefore the detailed description thereof will be omitted.

In this modification, the porous plate 20 can be moved along one side of the LCD 3 on the upper side of the emission surface of the backlight unit 1 by the moving unit 8. In front of and behind in the moving direction of the porous plate 20, light shielding masks (films) 7a and 7b for shielding light other than light through the through-holes 22 of the porous plate 20 are arranged. Further, although the porous plate 20 and the backlight unit 1 are set so as to contact each other in FIG. 8 and FIG. 9, it is not necessary for the porous plate 20 and the backlight unit 1 to be in contact with each other in this modification. Note that needless to say, also in this modification, the color filters of the first and second embodiments are used.

Figure 10A:
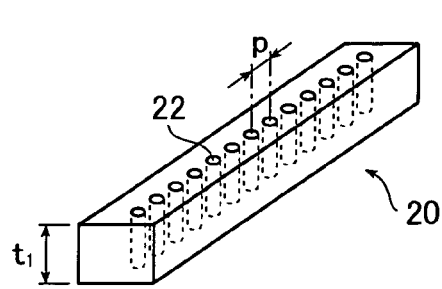
FIG. 10A is a perspective view showing a porous plate used in the first modification of the transfer apparatus according to the first embodiment of the first aspect of the present invention.
Figure 10B:
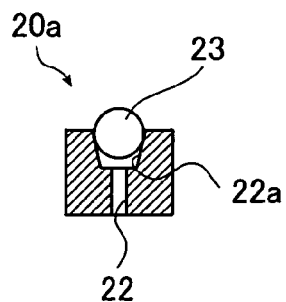
FIG. 10B is a schematic cross-sectional view showing another example of the porous plate used in the first modification of the transfer apparatus according to the first embodiment of the first aspect of the present invention.

FIG. 10A is a perspective view showing the porous plate used in the first modification of the transfer apparatus according to the first embodiment of the first aspect of the present invention. FIG. 10B is a schematic cross-sectional view showing another example of the porous plate used in the first modification of the transfer apparatus according to the first embodiment of the first aspect of the present invention. The porous plate 20 used in this modification is a light linearizing device that is arranged between the backlight unit 1 and the LCD 3 and makes light from the backlight unit 1 substantially linear and parallel rays so that the substantially parallel rays can perpendicularly enter the LCD 3. As shown in FIG. 10A, a large number of through-holes 22 of a predetermined size are formed in one row at a predetermined pitch in a rectangular plate having a predetermined thickness. Note that the through-holes 22 may be provided in multiple rows.

In a porous plate 20a shown in FIG. 10B, a continuous recess 22a is provided above the through-holes 22 arranged in one row, and a rod lens 23 is set in the recess 22a. With this porous plate 20a, light passing through the through-holes 22 of the porous plate 20a can be made more parallel by the function of the rod lens 23.

Moreover, in the present invention, instead of the porous plate, it is also possible to use a slit plate having a slit by which strip-like slit light can be obtained. However, the slit cannot reduce scattering of light in the longitudinal direction as a porous plate can do, so that the porous plate 20 shown in FIG. 10A and the porous plate 20a shown in FIG. 10B are more preferable than the slit plate. However, when the diffused component of light from the light source is small or when the requisite level of clarity is not so high, the slit plate may be used.

In the present invention, the light linearizing device has a function of making light from the light source linear and substantially parallel rays and causing the light to perpendicularly enter the transmission type image display device, and emits linear light having a predetermined length in a direction (longitudinal direction) perpendicular to a moving direction of this light linearizing device (scanning direction of a screen of the transmission type LCD). Here, the light linearizing device may be of any type so long as it has the above-mentioned function. Taking into account the easiness of production, however, as shown in FIG. 10A, it is preferable that it is formed as a so-called "columnar porous plate" that has a large number of through-holes 22 arranged at least in one row along the longitudinal direction, has a predetermined thickness, and is narrow and long.

In addition, in this modification, the distance between the porous plate 20 and the LCD 3 is set at preferably 0.05 mm to 10 mm, and more preferably 0.1 mm to 5 mm. It is desirable that this distance is adjustable to an arbitrary dimension. This setting is made for the purpose of preventing a pattern of the through-holes 22 of the light linearizing device, which is typified by the columnar porous plate 20, from appearing in the form of a "shadow" due to diffused light. Note that the distance set in this manner in this modification is a condition for preventing the "shadow" described above from occurring without causing any reduction in clarity of a transfer image.

Also, as to a material of the porous plate 20, the same material as in the first embodiment can be used. In addition, a shape of the through-holes 22 formed in the porous plate 20 can also be set to the same as in the first embodiment.

Figure 11A:
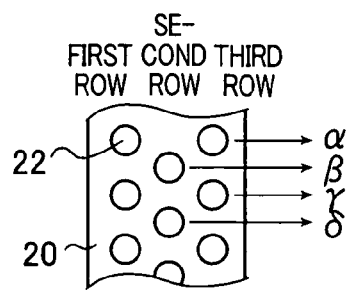
FIGS. 11A to 11D are each a front view showing an arrangement of trough-holes of the porous plate used in the first modification of the transfer apparatus according to the first embodiment of the first aspect of the present invention.
Figure 11B:
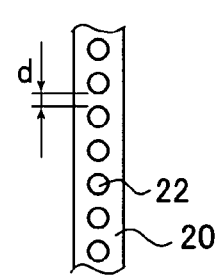
Figure 11C:
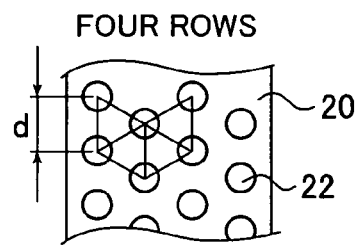
Figure 11D:
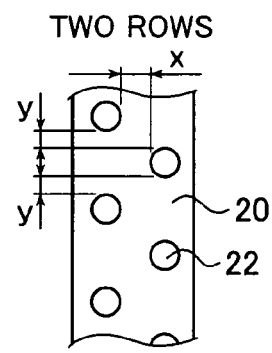

FIGS. 11A to 11D are each a front view showing the arrangement of the through-holes of the porous plate used in the first modification of the transfer apparatus according to the first embodiment of the first aspect of the present invention. FIG. 11A shows an arrangement in which the through-holes are formed in three rows, FIG. 11B shows an arrangement in which the through-holes are formed in one row, FIG. 11C shows an arrangement in which the through-holes are formed in four rows, and FIG. 11D shows an arrangement in which the through-holes are formed in two rows. Also, when the multiple through-holes 22 are arranged in two or more rows, there are no particular limitations regarding the number of rows of the through-holes and a shape of arrangement thereof. For instance, it is preferable that the shape of the arrangement is a check or a zigzag (close-packed shape), with the zigzag being a more preferable shape. Further, the number of the rows may be, for instance, one or more, but when the through-holes are formed in two or more rows and particularly in the zigzag shape, it is preferable that the number of rows is set at an even number. This is because when the through-holes 22 are formed in the porous plate 20 in three rows in the manner shown in FIG. 11A, that is, an odd number of rows of the through-holes 22 are formed, the LCD 3 is bright in lines α and γ because it is illuminated with the light from two through-holes 22 in the first and third rows, but the LCD is dark in lines β and δ because it is illuminated only with the light from one through-hole 22 in the second row. Thus, dark streaks are formed in the lines β and δ.

In addition, the arrangement pitch p of the multiple through-holes 22 provided in the porous plate 20 (see FIG. 10A) may be any pitch so long as the through-holes 22 are uniformly arranged and the display image of the LCD 3 can be clearly transferred onto the photosensitive film 4. It may be appropriately set in accordance with the size of the through-holes 22 or the like. For instance, it is preferable that the arrangement pitch p is reduced as much as possible.

It should be noted here that in this modification, the distance d between adjacent two through-holes 22 is not specifically limited, but the distance d is more important than the arrangement pitch p and the size of the through-holes 22. This is because if the distance d between the adjacent two through-holes 22 is increased, it becomes necessary to space the porous plate 20 apart from the LCD 3 in order to prevent the above-mentioned pattern of the through-holes 22 from appearing in the form of a "shadow" due to the diffused light. Therefore, for instance, the distance d between the adjacent two through-holes 22 is set at preferably 1 mm or less, more preferably 0.5 mm or less, and still more preferably 0.2 mm or less in terms of a distance y in the longitudinal direction (arrangement direction). Note that no specific limitation is imposed on the lower limit value of the distance d between the adjacent two through-holes 22, but the lower limit value of the distance d is preferably not less than approximately 0.05 mm taking into consideration the ease of production.

It should be noted here that the distance d between the adjacent two through-holes 22 in terms of the distance in the longitudinal direction refers to the distance d between the most adjacent two through-holes 22 when the through-holes 22 are formed in the porous plate 20 in one row as shown in FIG. 11B or when the through-holes 22 are formed in multiple rows (four rows in the illustrated example) in a close-packed shape as shown in FIG. 11C. The distance d between the adjacent two through-holes 22 in terms of the distance in the longitudinal direction also refers to the distance y between the most adjacent two through-holes 22 in the longitudinal direction when the through-holes 22 are arranged in multiple rows (two rows in the illustrated example) in a zigzag shape as shown in FIG. 11D and light is projected from a direction perpendicular to the longitudinal direction. Note that a distance x in the direction perpendicular to the longitudinal direction in the case of the zigzag shape shown in FIG. 11D has a higher degree of flexibility than the distance y mentioned above. For instance, the distance x is set at preferably 2 mm or less, more preferably 1 mm or less, and still more preferably 0.5 mm or less. As mentioned above, the distances x and y do not have to be set at the same values in the porous plate 20 used in the transfer apparatus of this modification. For instance, when the distance y is set at 0.2 mm, the distance x may be set at 0.5 mm or 1 mm. Thus, the present invention has an important characteristic that the production is facilitated by the reduction in constraints on the production.

The thickness $t_1$ of this porous plate 20 (see FIG. 10A) is preferably three or more times, more preferably five or more times, and still more preferably seven or more times the diameter or equivalent diameter of the through-holes 22, like in the first embodiment described above.

In addition, it is preferable that at least the inner surfaces of the through holes 22 in the entire surface of the porous plate 20 are formed as low reflectance surfaces, and it is more preferable that the entire surface of the porous plate 20 is formed as a low reflectance surface. Here, for instance, the low reflectance surface refers to a surface whose reflectance of incident light is decreased, such as a blackened surface or a roughened surface. There are no particular limitations regarding a method for forming the blackened surface. Examples of this method include a method with which a material that is black in itself is used as a material for forming the porous plate 20, or a method with which the surface is blackened. Note that as the black material, it is possible to use a material containing 1% or more (preferably 3% or more) of carbon black powder or a material obtained by hardening carbon powder, for instance. Examples of the blackening processing include, for instance, painting and chemical processing (plating, oxidization, electrolysis, etc.). Also, there are no particular limitations regarding the roughening processing either. Exemplary methods which may be arbitrarily used include a method with which a surface is roughened at the time of forming holes, or methods performed after the machining, such as a mechanical processing method (e.g., sandblasting) and a chemical processing method (e.g., etching). In this case, as a degree by which the surface is roughened, for instance, around 1 μm to 20 μm in a center line average roughness is an effective range.

It should be noted here that in this modification, the reflectance of at least the inner surfaces of the through-holes 22 of the porous plate 20, preferably, the reflectance of the low reflectance surface constituting the entire surface of the porous plate 20 is set at preferably 2% or less, and more preferably 1% or less. This is because if the reflectance is 2% or less, the porous plate 20 can absorb effectively scattered light other than parallel rays entering from the backlight unit 1, so that only substantially parallel rays (including parallel rays) can be effectively emitted from the backlight unit 1 and caused to enter the LCD 3. Note that the reflectance can be measured at a wavelength of 550 nm using a spectroreflectometer MPC3100 manufactured by Shimadzu Corporation, for instance.

As described above, the porous plate 20 is positioned between the backlight unit 1 serving as a light source and the LCD 3, and is constructed in the manner shown in FIGS. 8 and 9 so as to be movable laterally (in the longitudinal direction of the backlight unit 1) together with the light shielding masks 7a and 7b arranged in front of and behind in the moving direction of the porous plate 20. The movement of the porous plate 20 is effected for the purpose of shielding light from the backlight unit 1 serving as a planar light source other than light through the through-holes 22 of the porous plate 20 and, at the same time, making the light linear so that the linear light can be successively sent to the LCD 3.

It should be noted here that the moving unit 8 for moving this porous plate 20 includes a motor 8a arranged on the right end side of the backlight unit 1 in the drawing, a pulley 8c attached to the motor 8a, another pulley 8c arranged on the left end side of the backlight unit 1 in the drawing, and an endless belt 8b which is stretched between the pulleys 8c and 8c and to which the longitudinal end portion of the porous plate 20 is attached. Note that it is preferable that, as this moving unit 8, two sets that each include the endless belt 8b and the pulleys 8c and 8c for stretching the endless belt 8b are respectively attached to the end sides of the porous plate 20 in the longitudinal direction, with the two endless belts 8b (only one end side is shown) being continuously driven in synchronization with each other.

In addition, a speed at which the porous plate 20 is moved by the moving unit 8 varies depending on brightness of the backlight unit 1 serving as a light source, the size (diameter or equivalent diameter) or pitch of the through-holes 22 of the porous plate 20, and the like. However, it is preferable to set the speed at approximately several mm to several hundreds of mm per second.

It should be noted here that the moving unit 8 used in this modification is not limited to the above-described system in which the end portions of the porous plate 20 in the longitudinal direction are attached to the endless belts 8b and the endless belts 8b are driven. That is, any well-known conventional moving system may be adopted such as a system in which the porous plate 20 is secured to a traveling nut and a drive screw threadedly engaged with the traveling nut is driven, or a system in which the porous plate 20 is secured to one end of a wire and the wire is taken up.

When the color filters according to the present invention is used in the transfer apparatus of this modification, the color mixture of the three primary colors emitted from the LCD 3 is suppressed, and therefore there is obtained a transfer apparatus that is high in the color purity of the three primary colors and is excel in color reproductivity. As a result, it becomes possible to obtain a finished print having high image quality.

In the transfer apparatus of this embodiment, as described above, in order to satisfy the conditions necessary to realize an apparatus that is actually easy to handle, the LCD 3 and the photosensitive film 4, strictly speaking, the image display surface 3a of LCD 3 and the photosensitive surface 4a of the photosensitive film 4 are held in a non-contact state and are spaced apart from each other by a predetermined distance. In this modification, from the viewpoint of obtaining a clear transfer image, a disadvantage of increase in light diffusion due to the above arrangement is compensated for by an advantage of suppression of light diffusion through setting of the thickness of the porous plate 20 three or more times the diameter or equivalent diameter of the through-holes 22 of the porous plate 20. In addition, the advantage also includes suppression of light diffusion through regulation of the total thickness t of the substrate 32 and the polarizing film 31 on the photosensitive film 4 side of the LCD 3. As a result, it becomes possible to obtain a clearer transfer image even if the LCD 3 and the photosensitive film 4 are spaced apart from each other by the predetermined distance.

Figure 12:
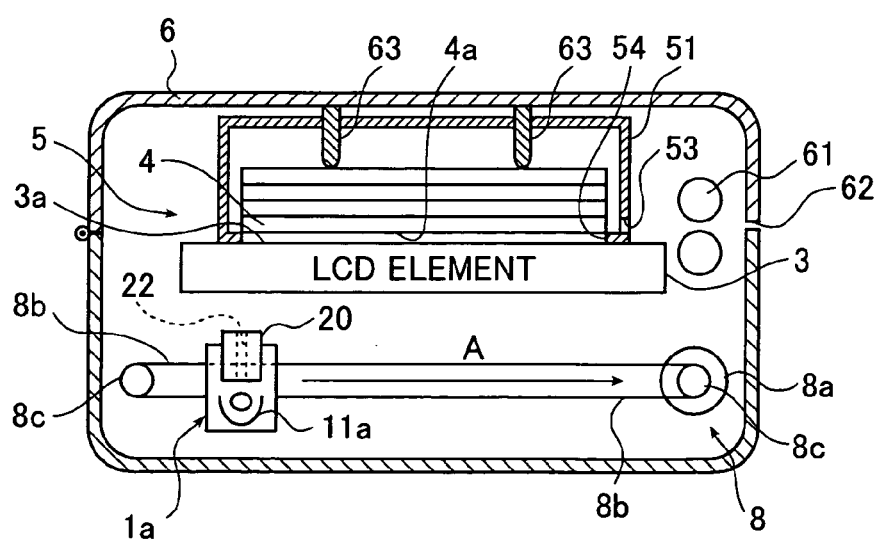
FIG. 12 is a schematic cross-sectional view showing a second modification of the transfer apparatus according to the first embodiment of the first aspect of the present invention.

Next, a second modification of the transfer apparatus according to the first embodiment of the first aspect of the present invention will be described. FIG. 12 is a schematic cross-sectional view showing the second modification of the transfer apparatus according to the first embodiment of the first aspect of the present invention. Note that in this modification, the same components as in the first modification of the transfer apparatus according to the first embodiment shown in FIGS. 8 to 11 are given the same reference numerals and the detailed description of the construction will be omitted.

This modification differs from the first modification in that the light source and the moving unit are changed, and other constructions are the same as those in the first modification. That is, the transfer apparatus according to the first modification uses the backlight unit 1 serving as a planer light source and the porous plate 20 serving as a light linearizing device to generate linear and substantially parallel rays. In this modification, however, a straight cold-cathode tube is used as a rod-shaped lamp serving as the linear light source 11a, for instance, as shown in FIG. 12. Note that needless to say, also in this modification, the color filters of the first and second embodiments are used.

The transfer apparatus of this modification shown in FIG. 12 has the same construction as the transfer apparatus of the first modification except that the linear light source 11a and the porous plate 20 are integrated as the linear and substantially parallel rays generating unit 1a and the light shielding masks 7a and 7b are not provided.

In the transfer apparatus shown in FIG. 12, the linear and substantially parallel rays generating unit 1a is a unit formed by integrally combining the linear light source 11a formed by a rod-shaped lamp (e.g., the straight cold-cathode tube) with the columnar porous plate 20 serving as the light linearizing device. The linear and substantially parallel rays generating unit 1a has a function of making light from the linear light source 11a linear and substantially parallel rays and causing the light to perpendicularly enter the transmission type LCD 3. The linear and substantially parallel rays generating unit 1a emits linear light having a width in a direction (longitudinal direction) that is perpendicular to a direction (scanning direction of the image display surface 3a of the transmission type LCD 3) in which the linear and substantially parallel rays generating unit 1a is moved with respect to the transmission type LCD 3.

In this modification, the linear and substantially parallel rays generating unit 1a side is moved with respect to the stationary transmission type LCD 3. Note that this modification is not limited to this, and the LCD 3 side integrated with the photosensitive film 4 may be moved with respect to the stationary linear and substantially parallel rays generating unit 1a. In this case, however, it becomes necessary to secure a space for two sheets of the photosensitive film 4, so that the arrangement in which the linear and substantially parallel rays generating unit 1a side is moved is more preferable because the structure of the apparatus can be made compact.

The linear light source 11a used in the linear and substantially parallel rays generating unit 1a has a rod-shaped lamp (such as a cold-cathode ray tube), a reflection plate (such as a diffusion film or a reflector), and the like and is adapted to uniformly diffuse light from the rod-shaped lamp by using the diffusion film, reflection plate, or the like. However, this modification is not limited to this, and any type of light source may be used so long as it provides strip-like light. For instance, a rod-type light source, an elongated organic EL panel and an elongated inorganic EL panel may be used singly or in combination to obtain strip-like slit light, or a light source or the like of a predetermined length and a slit plate may be used instead. Alternatively, LEDs or the like may be arranged in a row to obtain light dots in a row. In the latter case, it is preferable to set the LEDs in alignment with the through-holes 22 of the porous plate 20.

Note that, in this modification, it goes without saying that the porous plates 20 and 20a shown in FIGS. 10A and 10B can be used as the light linearizing device used in the linear and substantially parallel rays generating unit 1a. Apart from this, what is applicable to the transfer apparatus of the first modification shown in FIG. 8 is applicable to this modification without exception.

In addition, in this modification, as shown in FIG. 12, the linear and substantially parallel rays generating unit 1a itself formed by integrating the linear light source 1 with the porous plate 20 is attached to the endless belts 8b of the moving unit 8, which is different from the first modification shown in FIG. 8 in which the light linearizing device (porous plate 20) is attached to the endless belts 8b of the moving unit 8. Needless to say, however, there is no difference in the function and operation of the moving unit 8 and in the function and operation of the light linearizing device (porous plate) moved by the moving unit 8.

Like in the transfer apparatus of the first modification shown in FIG. 8, in the transfer apparatus of this modification shown in FIG. 12, the linear and substantially parallel rays generating unit 1a is moved by the moving unit 8 to successively irradiate the LCD 3 with linear light from the linear and substantially parallel rays generating unit 1a, so that an image formed on the LCD 3 is exposed by scanning and is illuminated. Even in this case, it is possible to obtain a high-quality finished print where color mixture is suppressed. Note that in the transfer apparatus of this modification shown in FIG. 12, it is possible to reduce the size of the light source in comparison with the transfer apparatus according to the first modification shown in FIG. 8. As a result, it becomes possible to further reduce the size of the apparatus structure.

Figure 13:
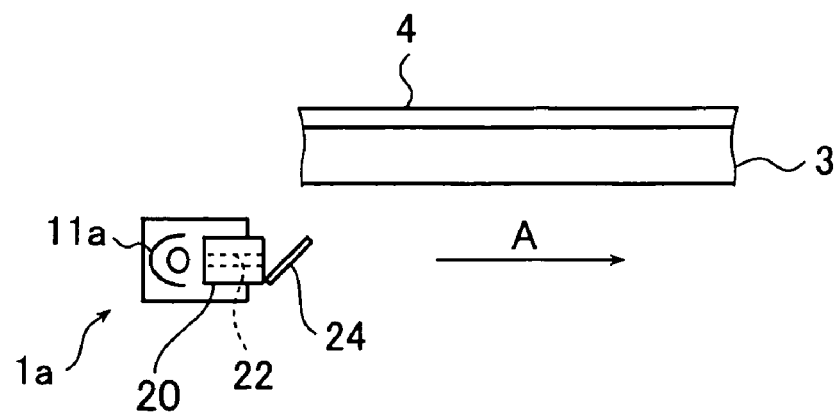
FIG. 13 is a schematic view showing a third modification of the transfer apparatus according to the first embodiment of the first aspect of the present invention.

FIG. 13 is a schematic view showing a third modification of the transfer apparatus according to the first embodiment of the first aspect of the present invention. Note that, in FIG. 13, only the linear and substantially parallel rays generating unit 1a, the photosensitive film 4, and the LCD 3 are illustrated, and other components are omitted. In this modification, the linear and substantially parallel rays generating unit 1a is arranged so that a direction A in which the linear and substantially parallel rays generating unit 1a moves, and an axial direction of the through-holes 22 are arranged parallel to each other. On an end face on the emission side of the porous plate 20, a mirror 24 is arranged at an angle of 45° with respect to the direction A so as to cause light emitted from the porous plate 20 to enter the LCD 3. With the structure of this modification, the same effect as in the second modification can be obtained, and at the same time, the apparatus can be made more compact than that of the second modification. Note that also in this modification, the color filters in the first and second embodiments are used.

In each of the first and second embodiments and the first to third modifications described above, the porous plate is used as the substantially parallel rays generating element. However, the present invention is not limited to this, and a SELFOC lens or the like may be used instead, for instance.

Next, a transfer apparatus according to a second aspect of the present invention will be described.

The transfer apparatus of this aspect has basically the same construction as that of the first aspect, and improves color reproducibility by improving color purity of respective colors of R, G, and B in a color image display device and preventing color mixture in an image transferred from the color image display device onto a photosensitive film. Therefore, in an embodiment of this aspect, there are prevented the mixture of light emission spectrums of RGB colors in the rod-shaped lamp 11 serving as a light source of the LCD 3.

Figure 27:
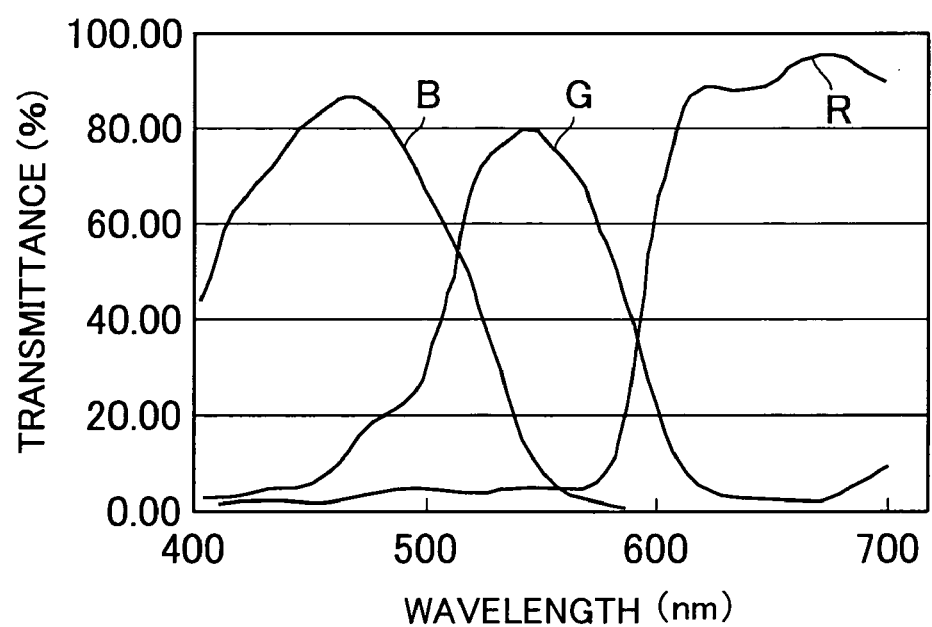
FIG. 27 is a graph showing an example of spectral transmittance of color filters of an LCD.

Here, the situation where the light emission spectrums of the RGB colors are not mixed with each other refers to a situation where there is suppressed light emission in the vicinity of color mixture ranges (for instance, R/G; 570 to 600 nm, G/B; 480 to 510 nm) in the photosensitive film 4 (for instance, the instant film for use in "cheki" manufactured by Fuji Photo Film Co., Ltd.) that, for instance, exhibits the spectral sensitivity distribution shown in FIG. 27. That is, when the light source has a light emission peak with a size that is equal to or more than a predetermined size in these color mixture ranges, color mixture is caused by the light emission peak in the color mixture ranges. As a result, light emission peaks having a size with which color development is caused in both of different color development layers (R and G, or G and B) need to be eliminated at least in the color mixture ranges.

Figure 14:
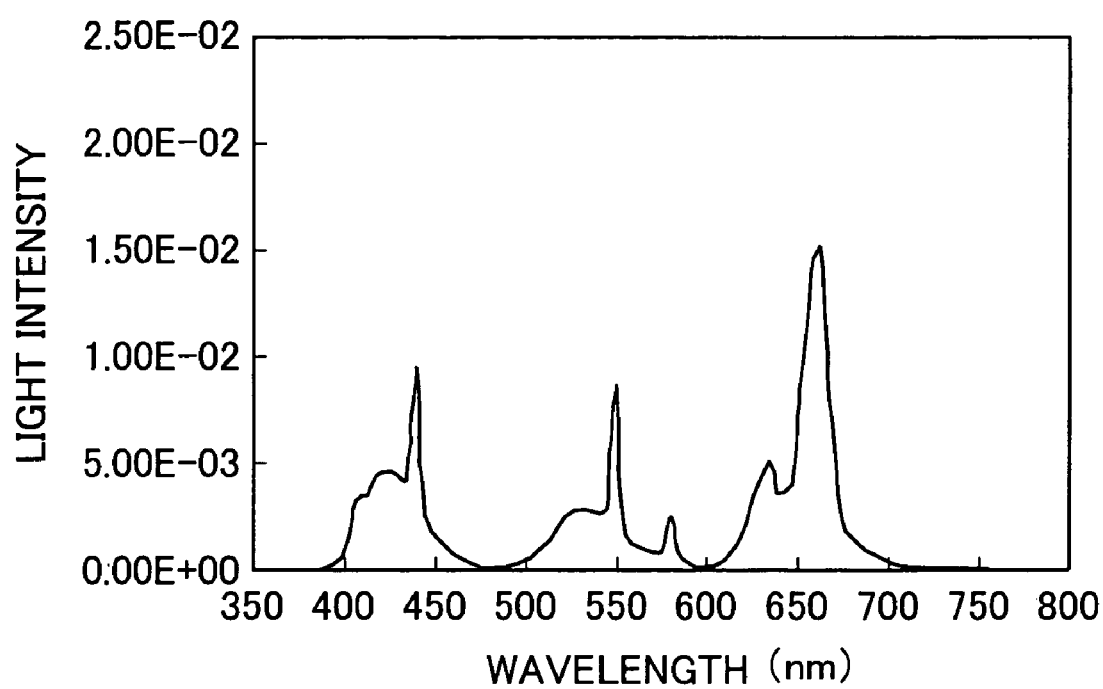
FIG. 14 is a graph showing a spectral spectrum of a light source used in an embodiment of a second aspect of the present invention.

Therefore, in this embodiment, the fluorescent material of the rod-shaped lamp 11 is changed, thereby obtaining a light source having a spectrum waveform shown in FIG. 14. As shown in FIG. 14, with the light source used in this embodiment, the main light emission peaks of R, G, and B are separated from each other by 100 nm or more. Also, in the color mixture ranges, there are eliminated light emission peaks having a size that exceeds a certain size with which both of two different color development layers develop their colors.

In contrast to this, in the case of the conventional light source shown in FIG. 24, although the maximum light emission peaks of R and B are separated from each other by 100 nm or more, the maximum peak of G at 550 nm is separated from a peak in the vicinity of 480 nm only by 70 nm. Also, the maximum light emission peaks of R and G respectively exist at 610 nm and 550 nm and are separated from each other only by around 60 nm. Under this condition, the lower portions of the main light emission peaks cause light emission in ranges in which the spectral sensitivities of the photosensitive recording medium overlap each other.

Also, in this embodiment, an LCD of 3.5 inch and 240,000 pixels manufactured by Casio Computer Co., Ltd. was used as the LCD 3, and the instant film for use in "cheki" manufactured by Fuji Photo Film Co., Ltd. was used as the photosensitive film 4. Further, like in the conventional example described above, displaying on the LCD 3 was performed only with G light, and an image was transferred onto the instant film serving as the photosensitive film 4.

Figure 15:
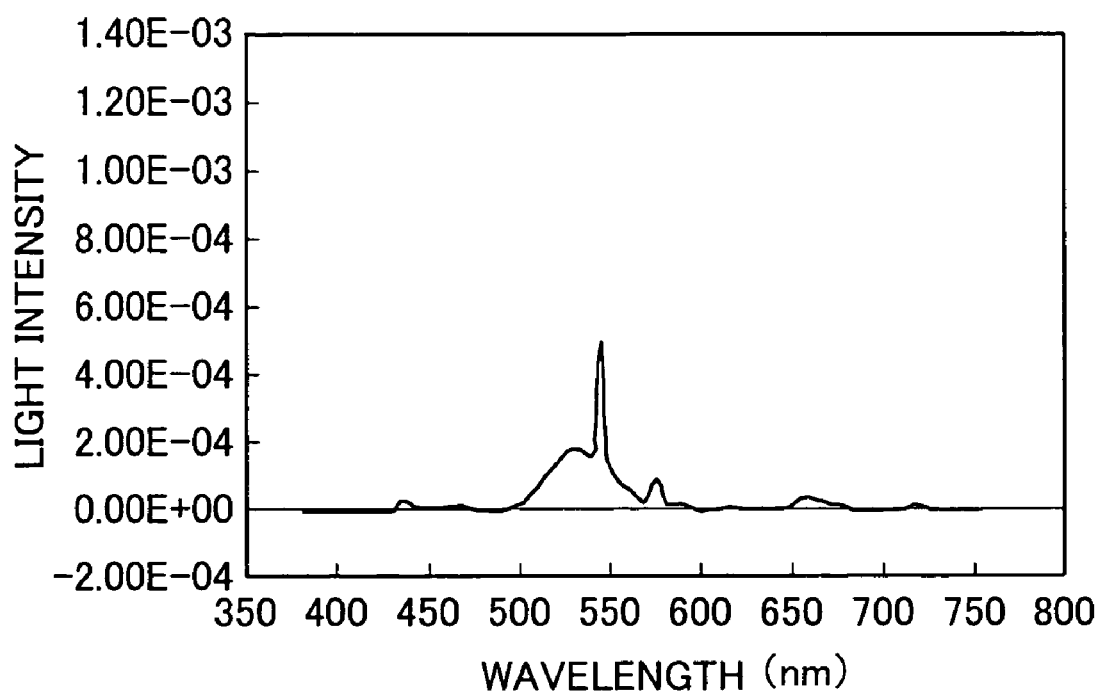
FIG. 15 is a graph showing a spectral distribution waveform of light having passed through a G filter in the embodiment of the second aspect of the present invention.

FIG. 15 shows the spectral distribution of light having passed through the G filter. As can be seen from FIG. 15, the light emission peak of blue in a range of 480 nm to 490 nm and the light emission in a lower wavelength range are extremely reduced. Note that the light emission in the red (R) range is also suppressed as compared with the conventional example shown in FIG. 24.

Figure 16:
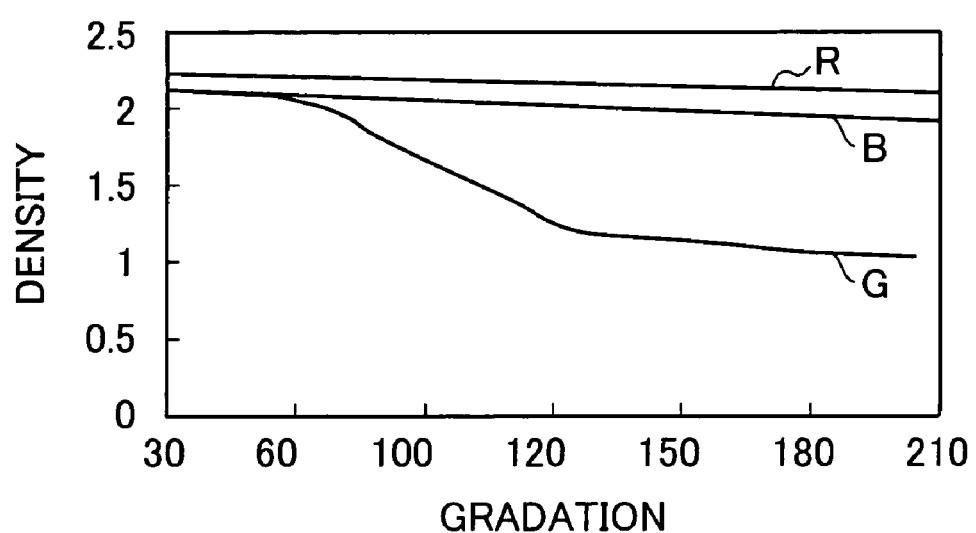
FIG. 16 is a graph showing a result of displaying G on an LCD and transferring it in the embodiment of the second aspect of the present invention.

FIG. 16 shows results of transferring of an image onto the instance film for use in "cheki" under the conditions described above. Like in FIG. 28 related to the conventional case, gradation is plotted in an abscissa axis and densities in an ordinate axis in FIG. 16, with the gradation being increased (brightness of an image displayed being increased) in a rightward direction on the abscissa axis and the density being reduced (that is, brightness being increased) in a downward direction on the ordinate axis. As shown in FIG. 16, in this embodiment, the G graph is lowered in accordance with an increase in the gradation, and therefore, the color G is developed very well. On the other hand, the R and B graphs extend in an approximately horizontal manner, and color development of R and B is suppressed.

Figure 28:
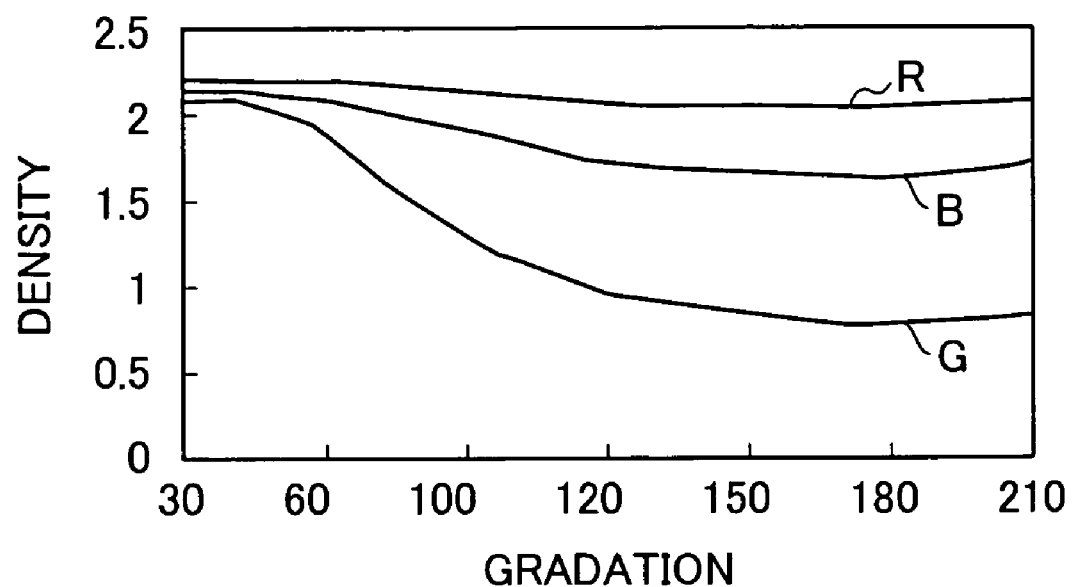
FIG. 28 is a graph showing a result of transferring based on G light displaying in a conventional transfer apparatus.

As is apparent from the comparison of FIG. 16 and FIG. 28, in FIG. 28 related to the conventional case, the B graph is also lowered and the color B is slightly developed. In FIG. 16 related to this embodiment, however, the B graph (and the R graph) exists only at the density of two or more, and the emission of B light is suppressed. That is, in this embodiment, a color reproduced on the instant film for use in "cheki" from G displayed on the LCD 3 is close to the pure color of G.

As described above, in this embodiment, it is possible to properly develop the pure color of G, and the same applies to R and B. As a result, it becomes possible to obtain the pure color of each of R, G, and B. Accordingly, by producing a light source with a selected fluorescent material with which the light emission spectrums of the rod-shaped lamp serving as a light source are not mixed with each other, and by adopting a transfer method using this light source in the manner described in this embodiment, it becomes possible to develop the pure color of each of R, G, and B, to develop other arbitrary colors by synthesizing these colors, and to improve the color reproductivity of a transfer image.

Also, as described above, the peak wavelengths are separated from each other by 100 nm or more, for instance. Therefore, it becomes easy to produce a filter with which colors that are not necessary to obtain pure colors are cut, to reduce the number of layers constituting the filter, and to produce the filter at low cost.

Further, the light source of the present invention is not limited to the rod-shaped lamp described above, and an LED array may be used instead. That is, even when a white light source is obtained by mixing light emitted from R, G, and B LEDs, the same effect can be obtained by separating the light emission peaks from each other so that the mixture of emitted R, G, and B light may be prevented. In this case, even when a color image is obtained by replacing the color LCD with a white-and-black LCD, driving the LED for red to emit light in order to generate an R image, and sequentially superimposing G and B images for exposure, it is possible to obtain a high-quality image like in the case described above.

Figure 17:
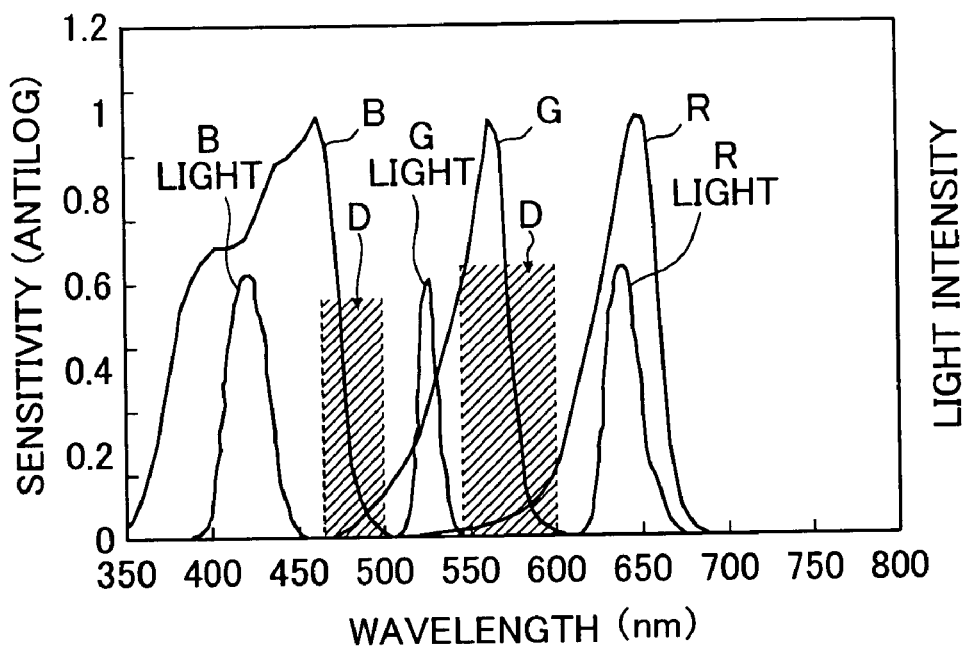
FIG. 17 is a graph showing a distribution of an intensity of light emitted from a light source with respect to a spectral sensitivity distribution of a photosensitive recording medium.

Also, when the present invention is considered from another angle, in order to prevent the color mixture more effectively, the prevent invention may be considered in the manner described below. For instance, as shown in FIG. 17, as to the RGB spectral sensitivities of the photosensitive recording medium, it is the most preferable that light (B light, G light, and R light) of the light source does not exist in each overlapping range indicated with reference symbol D in FIG. 17 and exists only in each range in which color mixture does not occur on the photosensitive recording medium. Here, the light of the light source refers to light obtained by multiplying the light of the backlight by the transmittance of the color LCD. Alternatively, in the case of a black-and-white panel, the light of the light source refers to light of the light source itself.

Also, it is the next most preferable that either of two kinds of overlapping light is emitted in each range in which the RGB spectral sensitivities of the photosensitive recording medium overlap each other, and an amount of the light emission of the overlapping light is suppressed to an amount of a predetermined light emission or less. For instance, it is possible to cite a case shown in FIG. 18 in which G light is emitted in the B and G overlapping range D and the G and R overlapping range D, although the R light is not emitted in the G range (R and G overlapping range D) and the B light is not emitted in the G range (B and G overlapping range D). In this case, although red (R) and blue (B) are slightly mixed into green (G), the pure colors of red and blue are maintained.

Figure 18:
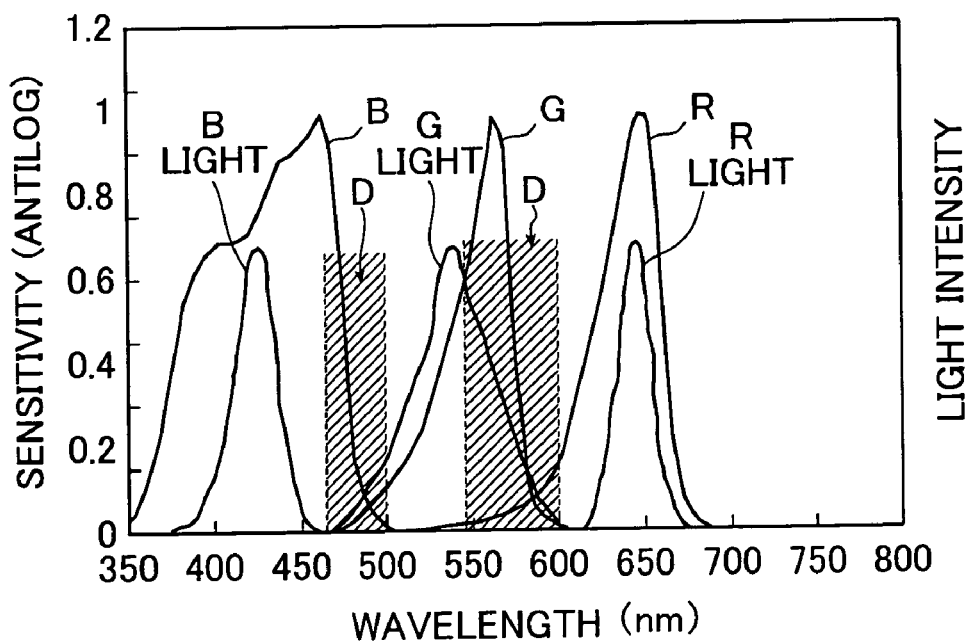
FIG. 18 is a graph showing another example of the distribution of the intensity of the light emitted from the light source with respect to the spectral sensitivity distribution of the photosensitive recording medium.

Further, it is the next most preferable that the B light, G light, and R light are emitted at a certain ratio or less in each range in which the spectral sensitivities overlap each other (overlapping ranges D shown in FIG. 17 or 18). Hereinafter, there will be described the certain ratio of the amount of the light emission or the amount of predetermined light emission used when one of two kinds of light overlapping in the spectral sensitivity overlapping range described above is emitted.

It is conceivable that the brightness of an image formed on the photosensitive recording medium through irradiation of light is determined by the sum of products of the intensity of the light at each wavelength and the spectral sensitivity at each wavelength. That is, assuming that the intensity of the light at each wavelength is $I_0$ and the spectral sensitivity at each wavelength is $G_0$, the brightness A of the image can be expressed by Expression (1) given below. Note that "∝" in the following expression indicates that both sides of $I_0$ and $G_0$ are proportional to each other.

$$A \propto (I_0 \times G_0) \quad (1)$$

For instance, in the case of blue (B), the brightness $A_B$ of a blue (B) image can be expressed by Expression (2) given below.

$$A_B \propto \Sigma(I_B \times G_B) \quad (2)$$

For instance, it is assumed that one of RGB light is emitted in the spectral sensitivity overlapping range described above, and I and G are both at 370 nm or in a range of 380 nm to 510 nm. When light emission is performed in the spectral sensitivity overlapping range under this condition, green (G) is also developed on the photosensitive material. The brightness $A_G$ of a G image due to this development can be expressed by Expression (3) given below.

$$A_G \propto \Sigma(I_G \times G_G) \quad (3)$$

Here, both I and G are in a range of 480 nm to a wavelength at which B light is emitted in the G range.

Here, it is sufficient that the ratio of $A_G$ calculated by Expression (3) described above to $A_B$ calculated by Expression (2) described above is less than a certain ratio. It is conceivable that this ratio is at most 50% or less, preferably 30% or less, more preferably 15% or less, and most preferably 10% or less. According to the way of thinking described above, when a light emission peak exists in the spectral sensitivity overlapping range or when no light emission peak exits in the spectral sensitivity overlapping range but the lower portion of the light emission is spread out, the size thereof need only be judged.

Next, a transfer apparatus according to a third aspect of the present invention will be described.

The transfer apparatus of this aspect has basically the same construction as that of the first aspect and properly reproduces the gray tone when an image displayed on a color image display device (LCD 3) is transferred onto a photosensitive recording medium (photosensitive film 4). Therefore, in embodiments of this aspect to be described later, there is prevented a situation where the RGB light emission spectrums of the rod-shaped lamp 11 serving as a light source of the LCD 3 are mixed with each other. In this manner, the color purity of each of R, G, and B of the LCD 3 is improved, and the color mixture is prevented in an image transferred onto the photosensitive film 4.

Here, a situation where the RGB light emission spectrums are not mixed with each other refers to the situation described in the section of the second aspect of the present invention. As shown in FIG. 17, ideally, it is most preferable that light (B light, G light, and R light) of the light source does not exist in the overlapping ranges D of the RGB spectral sensitivities of the photosensitive film 4 (instant film for use in "cheki") and exists only in ranges in which the color mixture on the photosensitive film 4 does not occur.

As described above, as a method for eliminating a light emission peak exceeding a predetermined size in the color mixture ranges (ranges indicated with the reference symbol D in FIG. 17) or realizing light emission only in ranges other than the color mixture ranges, it is possible to cite a method with which the fluorescent material of the rod-shaped lamp 11 serving as a light source is changed (selected) and a predetermined spectrum waveform is obtained, a method with which a white light source is realized using an array of RGB LEDs as a light source and their light emission peaks are separated from each other in order to prevent the mixture of RGB light emission, and the like.

In each embodiment of this aspect to be described below, in order to improve the color purity of each of R, G, and B, the gray tone is controlled so that gray is properly expressed on the photosensitive film 4 (instant film for use in "cheki").

First, a first embodiment of this aspect will be described.

In this embodiment, gray balance adjustment of an image reproduced on the photosensitive film 4 is performed by changing RGB transmission characteristics of a color filter 38 of the LCD 3. Note that in this embodiment and other embodiments to be described later, the gray balance means a gray balance of a transfer image obtained by transferring an image onto the photosensitive film 4 (instant film for use in "cheki"). Accordingly, the gray balance depends on the spectral sensitivity characteristics of the photosensitive film 4 (instant film for use in "cheki") shown in FIG. 25 and the spectral distribution characteristics of the light source.

In this embodiment, the transmission characteristics of the color filter 38 constituting the LCD 3 shown in FIG. 4 is changed in accordance with the spectral distribution characteristics of the rod-shaped lamp 11 of the backlight unit 1 serving as a light source and the spectral sensitivity characteristics of the photosensitive film 4. When gray reproduced on the photosensitive film 4 takes on a blue tinge, for instance, the intensity of blue light is strong, so that the gray balance is adjusted by increasing the density of the blue (B) color filter 38B of the color filter 38 to reduce the transmission characteristics of blue light (B light).

The transmission characteristics of the color filter 38 of the LCD 3 is changed in accordance with the spectral distribution characteristics of the photosensitive film 4 and the rod-shaped lamp 11 in this manner. Then, the film pack 5 accommodating the photosensitive films 4 is set in the main body case 6, and the backlight unit 1 is turned on to thereby display a predetermined image on the LCD 3. In this manner, the image on the LCD 3 is transferred onto the photosensitive film 4.

After the image is transferred onto the photosensitive film 4, the exposed photosensitive film 4 is extracted from the film case 51 by a not-shown claw member, a processing liquid tube (not shown) provided at one end of the photosensitive film 4 is pushed open by a pair of rollers 61 for transferring a film and spreading out the processing liquid, and a processing step is carried out in which the processing liquid is caused to uniformly spread over the entire surface of the photosensitive film 4 and development is performed. The photosensitive film 4 processed in the processing step in this manner is sent to the outside of the apparatus through an outlet port 62 of the main body case 6.

According to this embodiment, the gray balance of an image transferred onto the photosensitive film 4 is adjusted by changing the transmission characteristics of the color filter 38 of the LCD 3, so that it becomes possible to obtain an image that is superior in color reproductivity.

Next, a second embodiment of this aspect will be described.

In this embodiment, the wavelength spectrum or light intensity of the rod-shaped lamp 11 of the backlight unit 1 serving as a light source is changed, thereby performing adjustment of a gray balance of an image reproduced on the photosensitive film 4.

When gray of an image reproduced on the photosensitive film 4 takes on a blue tinge, for instance, the intensity of blue light is strong. Therefore, the spectrum waveform is changed so that the wavelength of the light source is shifted in a direction in which the blue tinge is weak. In this manner, the gray balance is adjusted. At this time, the wavelength is shifted to a range in which the pure color of each of R, G, and B is properly reproduced, with this process being performed as the preparation in the above embodiment. Also, when the rod-shaped lamp 11 is used as a light source like in this embodiment, it is possible to perform this wavelength spectrum changing by changing fluorescent material of the light source or by changing mixture ratio of the fluorescent material.

In this embodiment, when image transferring is performed, the gray balance of an image transferring onto the photosensitive film 4 is adjusted by changing the spectrum waveform of the light from the light source in this manner. Accordingly, the waveform of the light from the light source is adjusted. Other constructions are the same as those in the first embodiment described above.

Next, a third embodiment of this aspect will be described.

In this embodiment, light components having high intensity are absorbed by a filter to thereby reduce the amount of the light, like in the first embodiment described above. In this embodiment, however, the color filter 38 is used as it is and a filter (absorption filter) for absorbing such light components with high intensity is separately inserted between the backlight unit 1 and the photosensitive film 4.

The absorption filter absorbs light that exists in a predetermined wavelength band and causes the loss of a gray balance. In this manner, the gray balance is adjusted. Note that, the number of absorption filters is not limited to one, when the wavelength band of such light with high intensity is dispersed across multiple bands, and multiple absorption filters having absorption power corresponding to respective wavelength bands may be combined with each other for use.

The absorption filter is not specifically limited so long as it provides an effect that light in the predetermined wavelength range is selectively absorbed. For instance, it is possible to use a dichroic mirror as the absorption filter. The dichroic mirror causes only light with a specific wavelength to pass through the mirror by utilizing interference of light.

Also, a position at which the absorption filter is inserted is not specifically limited so long as the filter exists between the backlight unit 1 and the photosensitive film 4. For instance, it is possible to attach the absorption filter to the porous plate 2 or the LCD 3. This embodiment is the same as the first embodiment except that the gray balance adjustment is performed by reducing the transmission characteristics of light with high intensity using the absorption filter.

Next, a fourth embodiment of this aspect will be described.

In each embodiment described above, the transmission characteristics of the filter are changed or the spectrum waveform of the light from the light source is changed. In this embodiment, however, image data (digital image data) of an image displayed on the LCD 3 is changed so that the intensity of light having strong components is reduced, thereby adjusting the gray balance of an image reproduced on the photosensitive film 4.

As described above, the image displayed on the LCD 3 is supplied from a digital image data supply section of a digital still camera, a digital video camera, a personal computer or the like. When this digital image data is converted in a data processing device into image data for displaying on the LCD, if there exists data of light whose intensity is so strong that the data of light may exert an influence on the gray balance of a reproduced image, the intensity of light is reduced by a control device or the like, thereby adjusting the gray balance. Even when image data to be displayed on the LCD 3 is changed in this manner in place of the light itself, it is possible to perform the gray balance adjustment.

In each embodiment described above, the gray balance adjustment is performed by changing the light transmission characteristics of the filter or changing the spectrum waveform of the light from the light source. In each embodiment to be described below, however, the gray balance adjustment is performed by controlling amount of exposure through control of an image exposure period of time.

Next, a fifth embodiment of this aspect will be described.

Figure 19:
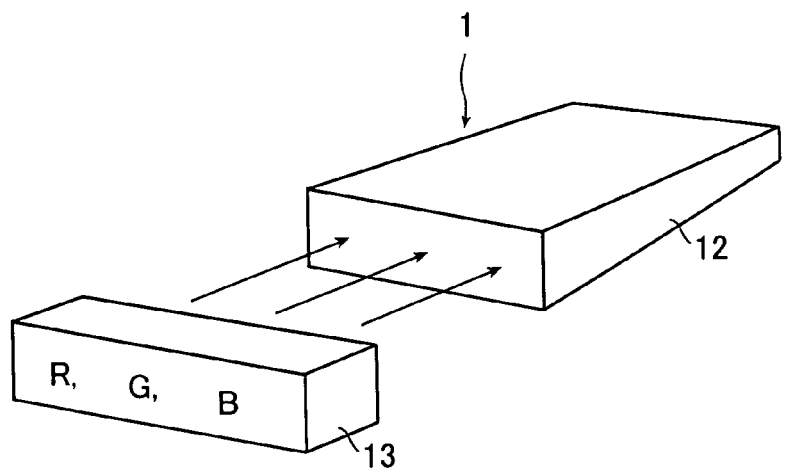
FIG. 19 is a schematic perspective view showing a schematic construction of a backlight unit of a transfer apparatus according to a fifth embodiment of a third aspect of the present invention.

FIG. 19 schematically shows the backlight unit 1 of a transfer apparatus of this embodiment. As shown in FIG. 19, the backlight unit 1 in this embodiment includes a light guide plate 12 and a light source 13 introducing RGB light into the light guide plate 12, with the light source 13 being capable of independently controlling the emission of RGB light. With this construction, the gray tone is controlled by independently controlling the emission period of the RGB light. Alternatively, the gray tone adjustment is performed by first turning on the RGB light at the same time for a given period and then turning off the RGB light at different timings.

Here, the light source 13 for emitting light to be introduced into the light guide plate 12 is not specifically limited and may be an LED light source that is capable of controlling the emission of the RGB light independently of each other, for instance. Also, the light source 13 may be a light source that is capable of controlling the intensity of light emitted as well as the emission period of the RGB light. In that case, it is also possible to adjust the gray balance by controlling an amount of exposure through control of the intensity of the RGB light as well as the emission period of the RGB light. Note that constructions other than the backlight unit 1 are the same as those in each embodiment described above.

Next, a sixth embodiment of this aspect will be described.

Figure 20:
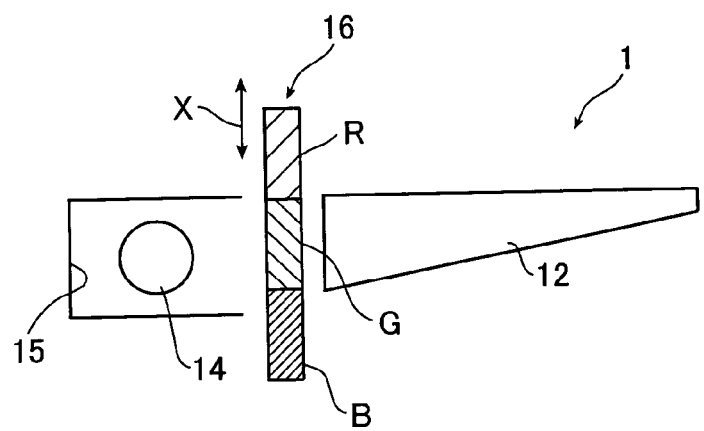
FIG. 20 is a side view showing a schematic construction of a backlight unit of a transfer apparatus according to a sixth embodiment of the third aspect of the present invention.

In the fifth embodiment described above, each of the RGB light is emitted. In this embodiment, however, white light is emitted, and the exposure period of RGB light are controlled by performing switching among RGB filters. FIG. 20 schematically shows the backlight unit 1 of a transfer apparatus of this embodiment. As shown in FIG. 20, the backlight unit 1 of this embodiment is constructed so that light emitted from a rod-shaped lamp 14 is condensed by a reflection plate 15 to be introduced into the light guide plate 12. Also, RGB color filters 16 are provided between the rod-shaped lamp 14 and the light guide plate 12 so that switching among these filters 16 is possible.

The RGB color filters 16 are planarly arranged and are slid in a direction shown by an arrow X in the drawing, thereby introducing each of the RGB light into the light guide plate 12. At this time, the color filter 16 is slid in the direction of the arrow X to thereby independently control timings for performing switching among the RGB light (timings for emitting the RGB light). In this manner, the amount of exposure of each of the RGB light is controlled, and a gray balance is adjusted. A moving unit for sliding the color filters 16 is not specifically limited, and any well-known conventional moving unit may be used.

Next, a seventh embodiment of this aspect will be described.

Figure 21:
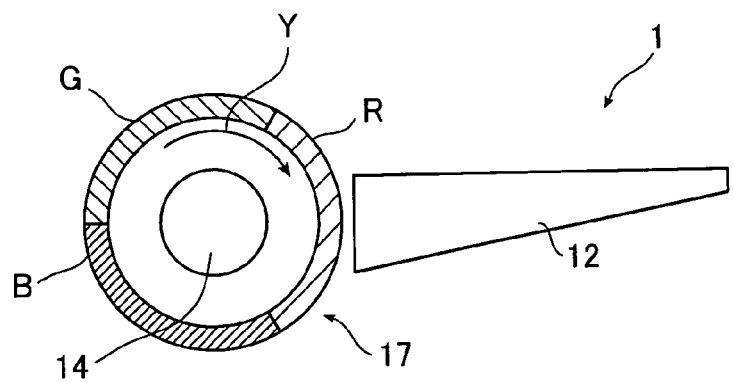
FIG. 21 is a side view showing a schematic construction of a backlight unit of a transfer apparatus according to a seventh embodiment of the third aspect of the present invention.

In this embodiment, like in the sixth embodiment described above, color filters are arranged between the rod-shaped lamp and the light guide plate and switching among the color filters is performed, thereby controlling the amount of exposure of each of RGB light and adjusting a gray balance. FIG. 21 schematically shows the backlight unit 1 of a transfer apparatus of this embodiment. As shown in FIG. 21, in this embodiment, RGB color filters 17 are arranged around the rod-shaped lamp 14 in a circular manner (cylindrical manner), and the color filters 17 are rotated around the rod-shaped lamp 14 in a direction of an arrow Y shown in this drawing, thereby performing switching among the RGB light. The color filters 17 are rotated around the rod-shaped lamp 14 in this manner, thereby controlling the exposure period of each of RGB light. As a result, it becomes possible to adjust a gray balance in the same manner as in the sixth embodiment described above.

The respective embodiments as described above may be implemented singly. However, a greater effect can be achieved on the gray balance adjustment by implementing arbitrary combinations thereof.

The transfer apparatus according to the present invention have been described in detail above based on the embodiments of respective aspects of the present invention. However, the present invention is not limited to the embodiments described above, and it is of course possible to make various modifications and changes without departing from the gist of the present invention.

What is claimed is:

1. A transfer apparatus comprising:
a light source;
a transmission type image display device that has a structure where a liquid crystal layer is held by substrates from both sides; and
red, green, and blue color filters provided for said transmission type image display device,
wherein a photosensitive recording medium is arranged in series with said light source and said transmission type image display device along an advancing direction of light from said light source so that an image display surface of said transmission type image display device and a recording surface of said photosensitive recording medium oppose each other, and
a display image having passed through said transmission type image display device is transferred onto said recording surface of said photosensitive recording medium,
wherein accumulated maximum transmittance of said color filters in each of ranges, in which respective spectral transmittance curves of said color filters overlap each other, is set smaller than a predetermined value.

2. The transfer apparatus according to claim 1,
wherein peak transmittance of each of said color filters is set lower than a predetermined value.

3. The transfer apparatus according to claim 1,
wherein each of said color filters contains a material that lowers transmittance at wavelengths in a range, in which at least two of said respective spectral transmittance curves of said color filters overlap each other, to below a predetermined value.

4. The transfer apparatus according to claim 1, further comprising:
a substantially parallel rays generating element that is arranged between said light source and said transmission type image display device and is provided with a plurality of through-holes,
wherein light from said light source is made to enter said transmission type image display device as the substantially parallel rays by said substantially parallel rays generating element.

5. The transfer apparatus according to claim 4,
wherein said substantially parallel rays generating element is provided over an entire surface of an image display area of said transmission type image display device.

6. The transfer apparatus according to claim 4,
wherein said substantially parallel rays generating element is provided along one side of an image display area of said transmission type image display device, and said transfer apparatus further comprising:
a moving unit which moves said substantially parallel rays generating element along a side perpendicular to said one side of said image display area of said transmission type image display device; and
light shielding masks that are provided before and after a moving direction of said substantially parallel rays generating element and shield light other than light from said through-holes of said substantially parallel rays generating element.

7. A transfer apparatus comprising:
a light source; and
a transmission type image display device,
wherein a photosensitive recording medium is arranged in series with said light source and said transmission type image display device along an advancing direction of light from said light source, and
a display image having passed through said transmission type image display device is transferred onto said photosensitive recording medium directly or through an image projecting unit,
wherein said light source is constructed so that a light emission peak exceeding a predetermined size does not exist in each range in which at least two of red, green, and blue spectral sensitivities of said photosensitive recording medium overlap each other.

8. The transfer apparatus according to claim 7,
wherein said light source is constructed so that only one of red light, green light, and blue light is emitted from said light source in each range in which at least two of said red, green, and blue spectral sensitivities of said photosensitive recording medium overlap each other.

9. The transfer apparatus according to claim 7,
wherein said light source is constructed so that light from said light source exists only in each range other than each range in which at least two of said red, green, and blue spectral sensitivities of said photosensitive recording medium overlap each other.

10. A transfer apparatus comprising:
a light source; and
a transmission type image display device,
wherein a photosensitive recording medium is arranged in series with said light source and said transmission type image display device along an advancing direction of light from said light source, and
a display image of said transmission type image display device is transferred onto said photosensitive recording medium by exposing said photosensitive recording medium using light having passed through said transmission type image display device,
wherein said transfer apparatus further comprises:
a control unit for controlling a tone of gray to be recorded on said photosensitive recording medium by controlling at least one of a wavelength and a light quantity of light passing through said transmission type image display device.

11. The transfer apparatus according to claim 10,
wherein said control unit controls said at least one of said wavelength and said light quantity of said light passing through said transmission type image display device by changing transmission characteristics of at least one of color filters of said transmission type image display device.

12. The transfer apparatus according to claim 10,
wherein said control unit is an absorption filter that is arranged between said light source and said photosensitive recording medium, and controls said at least one of said wavelength and said light quantity of said light passing through said transmission type image display device by absorbing light from said light source in a predetermined wavelength band.

13. The transfer apparatus according to claim 12,
wherein said absorption filter is a dichroic mirror.

14. The transfer apparatus according to claim 10,
wherein said control unit controls said light quantity by controlling intensity of said light passing through said transmission type image display device or an exposure time during which said photosensitive recording medium is to be exposed.

15. The transfer apparatus according to claim 14,
wherein said control unit controls intensity of said light passing through said transmission type image display device by changing image data of an image to be displayed by said transmission type image display device.

16. The transfer apparatus according to claim 14,
wherein said light source is capable of controlling emission of red, green, and blue light independently of each other, and
said control unit controls an exposure time of each of said red, green and blue light by said light source, during which said photosensitive recording medium is to be exposed, by controlling an emission time of each of said red, green, and blue light by said light source.

17. The transfer apparatus according to claim 14,
wherein said light source irradiates white color,
red, green and blue color filters are arranged on an optical path of said light source, and
said control unit controls exposure time of each of red, green and blue color, during which said photosensitive recording medium is to be exposed, by controlling timings at which switching among said red, green, and blue color filters is performed.

* * * * *